US009509229B2

(12) United States Patent
Lee et al.

(10) Patent No.: US 9,509,229 B2
(45) Date of Patent: Nov. 29, 2016

(54) POWER SUPPLY APPARATUS INCLUDING POWER CONVERSION CIRCUIT CONTROLLED BY PWM CONTROL CIRCUIT

(75) Inventors: Tingan Lee, Chuo-ku (JP); Masahiro Kinoshita, Chuo-ku (JP); Nobuyuki Nagai, Chuo-ku (JP); Kazunori Sanada, Chuo-ku (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 102 days.

(21) Appl. No.: 14/380,129

(22) PCT Filed: Mar. 30, 2012

(86) PCT No.: PCT/JP2012/058517
§ 371 (c)(1),
(2), (4) Date: Aug. 21, 2014

(87) PCT Pub. No.: WO2013/145248
PCT Pub. Date: Oct. 3, 2013

(65) Prior Publication Data
US 2015/0016155 A1 Jan. 15, 2015

(51) Int. Cl.
*H02M 7/219* (2006.01)
*H02M 7/5387* (2007.01)
(Continued)

(52) U.S. Cl.
CPC ............ *H02M 7/219* (2013.01); *H02M 1/12* (2013.01); *H02M 5/4585* (2013.01); *H02M 7/53875* (2013.01); *H02M 5/458* (2013.01); *H02M 7/483* (2013.01); *H02M 7/487* (2013.01)

(58) Field of Classification Search
CPC .... H02M 5/458; H02M 7/483; H02M 7/487; H02M 7/219; H02M 7/53875; H02M 1/12
See application file for complete search history.

(56) References Cited

U.S. PATENT DOCUMENTS 5,892,674 A * 4/1999 Shimada ............... H02M 7/219
363/127
6,324,085 B2 * 11/2001 Kimura ................. H02M 7/538
318/811

(Continued)

FOREIGN PATENT DOCUMENTS

JP 10-257775 A 9/1998
JP 2005-51959 2/2005

(Continued)

OTHER PUBLICATIONS

Decision to Grant Patent issued Jun. 23, 2015 in Japanese Patent Application No. 2014-507212 (with English language translation).

(Continued)

*Primary Examiner* — Fred E Finch, III
*Assistant Examiner* — Rafael O. De León Domenech
(74) *Attorney, Agent, or Firm* — Oblon, McClelland, Maier & Neustadt, L.L.P.

(57) ABSTRACT

A power conversion circuit connected to a three phase alternating current line is controlled in a PWM system. To control an arm corresponding to each phase, first to third carrier wave signals are generated. The first to third carrier wave signals include two signals having phases, respectively, offset by 180 degrees from each other. This allows a zero phase component to less frequently reach a peak value and be accordingly reduced as time averaged. This can reduce a zero phase harmonic component generated from a power supply apparatus.

6 Claims, 18 Drawing Sheets

(51) Int. Cl.
*H02M 1/12* (2006.01)
*H02M 5/458* (2006.01)
*H02M 7/483* (2007.01)
*H02M 7/487* (2007.01)

(56) References Cited

U.S. PATENT DOCUMENTS

| | | | |
|---|---|---|---|
| 6,757,185 B2* | 6/2004 | Rojas Romero | H02M 1/4216 363/89 |
| 2003/0128563 A1 | 7/2003 | Rojas Romero | |
| 2006/0034364 A1* | 2/2006 | Breitzmann | H02M 7/53871 375/238 |
| 2011/0134672 A1* | 6/2011 | Sato | H02M 1/10 363/126 |

FOREIGN PATENT DOCUMENTS

| | | |
|---|---|---|
| JP | 2008-271617 | 11/2008 |
| JP | 2011-114991 | 6/2011 |
| JP | 2011-229278 A | 11/2011 |
| KR | 10-2010-0107076 | 10/2010 |
| KR | 10-2011-0033289 | 3/2011 |

OTHER PUBLICATIONS

International Search Report issued Jun. 5, 2012, in PCT/JP2012/058517, filed Mar. 30, 2012.
Office Action issued Feb. 3, 2016 in Korean Patent Application No. 10-2014-7023928 (with English translation).
A. Radan et al., "Evaluation of Carrier-Based PWM Methods for Multi-level Inverters", IEEE International Symposium on Industrial Electronics, Jun. 7, 2007, pp. 389-394.
Extended European Search Repot issued May 27, 2016 in Patent Application No. 12873297.1.
Combined Chinese Office Action and Search Report issued Apr. 26, 2016 in Patent Application No. 201260071984.1 (with English Translation and English Translation of Category of Cited Documents).
Office Action issued Aug. 25, 2016, in Korean Patent Application No. 10-2014-7023928.

* cited by examiner

| STATE OF SWITCH OF EACH PHASE | U | 0 | 1 | 1 | 0 | 0 | 0 | 1 | 1 |
|---|---|---|---|---|---|---|---|---|---|
| | V | 0 | 0 | 1 | 1 | 1 | 0 | 0 | 1 |
| | W | 0 | 0 | 0 | 0 | 1 | 1 | 1 | 1 |
| VOLTAGE VECTOR | | E(000) | E(100) | E(110) | E(010) | E(011) | E(001) | E(101) | E(111) |

POWER SUPPLY APPARATUS INCLUDING POWER CONVERSION CIRCUIT CONTROLLED BY PWM CONTROL CIRCUIT

TECHNICAL FIELD

The present invention relates to a power supply apparatus, and particularly to pulse width modulation (PWM) control of a power conversion circuit.

BACKGROUND ART

An inverter is a power conversion circuit including a switching element. Pulse width modulation (PWM) control is one of representative methods applied to control inverters. When the PWM control method is applied to control an inverter, a carrier wave and a signal wave are compared to generate a gate signal for controlling a switching element.

Generally, a three phase PWM inverter generates common mode voltage. The common mode voltage includes a zero phase harmonic component.

Japanese Patent Laying-Open No. 2008-271617 (PTD 1) discloses a power conversion device that allows a motor to have a low speed range with a waveform characteristic held equivalent to a conventional, three phase modulation system and also reduces electromagnetic wave. The power conversion device generates three triangular wave carriers corresponding to three phases, respectively, independently from each other. Furthermore, the three triangular wave carriers are provided with a phase difference. For example, one of the triangular wave carriers is increased in frequency to be temporarily higher in frequency than the others of the triangular wave carriers.

Japanese Patent Laying-Open No. 2005-051959 (PTD 2) discloses a configuration for reducing a leakage current of a power conversion device. This configuration allows a voltage command value for each phase and a triangular wave to be compared to generate three pulsing signals. When two pulsing signals are simultaneously generated, one pulsing signal is delayed relative to the other pulsing signal.

CITATION LIST

Patent Documents

PTD 1: Japanese Patent Laying-Open No. 2008-271617
PTD 2: Japanese Patent Laying-Open No. 2005-051959

SUMMARY OF INVENTION

Technical Problem

The zero phase harmonic component causes not only higher harmonic noise but also filtering loss. As such, there is a demand for reducing the harmonic component. This issue is associated not only with a three phase inverter but also a converter connected to a three phase alternating current (ac) line.

The present invention contemplates reducing a zero phase harmonic component generated from a power conversion circuit included in a power supply apparatus.

Solution to Problem

The present invention in one aspect provides a power supply apparatus including: a power conversion circuit including first to third arms connected to first to third alternating current lines, respectively; a filter disposed between the first to third alternating current lines and the power conversion circuit; and a PWM control circuit for controlling the power conversion circuit in a pulse width modulation (PWM) method. The PWM control circuit includes: a voltage command value generation circuit generating first to third voltage command values corresponding to the first to third alternating current lines, respectively, in voltage; a carrier wave signal generation circuit generating first to third carrier wave signals corresponding to the first to third voltage command values, respectively; a first comparator comparing the first voltage command value with a value of the first carrier wave signal to generate a first control signal for controlling the first arm; a second comparator comparing the second voltage command value with a value of the second carrier wave signal to generate a second control signal for controlling the second arm; and a third comparator comparing the third voltage command value with a value of the third carrier wave signal to generate a third control signal for controlling the third arm. The first to third carrier wave signals include first and second signals having phases offset by 180 degrees from each other.

Advantageous Effect of Invention

The present invention can thus reduce a zero phase harmonic component generated from a power conversion circuit included in a power supply apparatus.

DESCRIPTION OF EMBODIMENTS

Hereinafter reference will be made to the drawings to describe the present invention in embodiments more specifically. In the figures, identical or corresponding components are identically denoted and will not be described repeatedly.

First Embodiment

Figure 1:
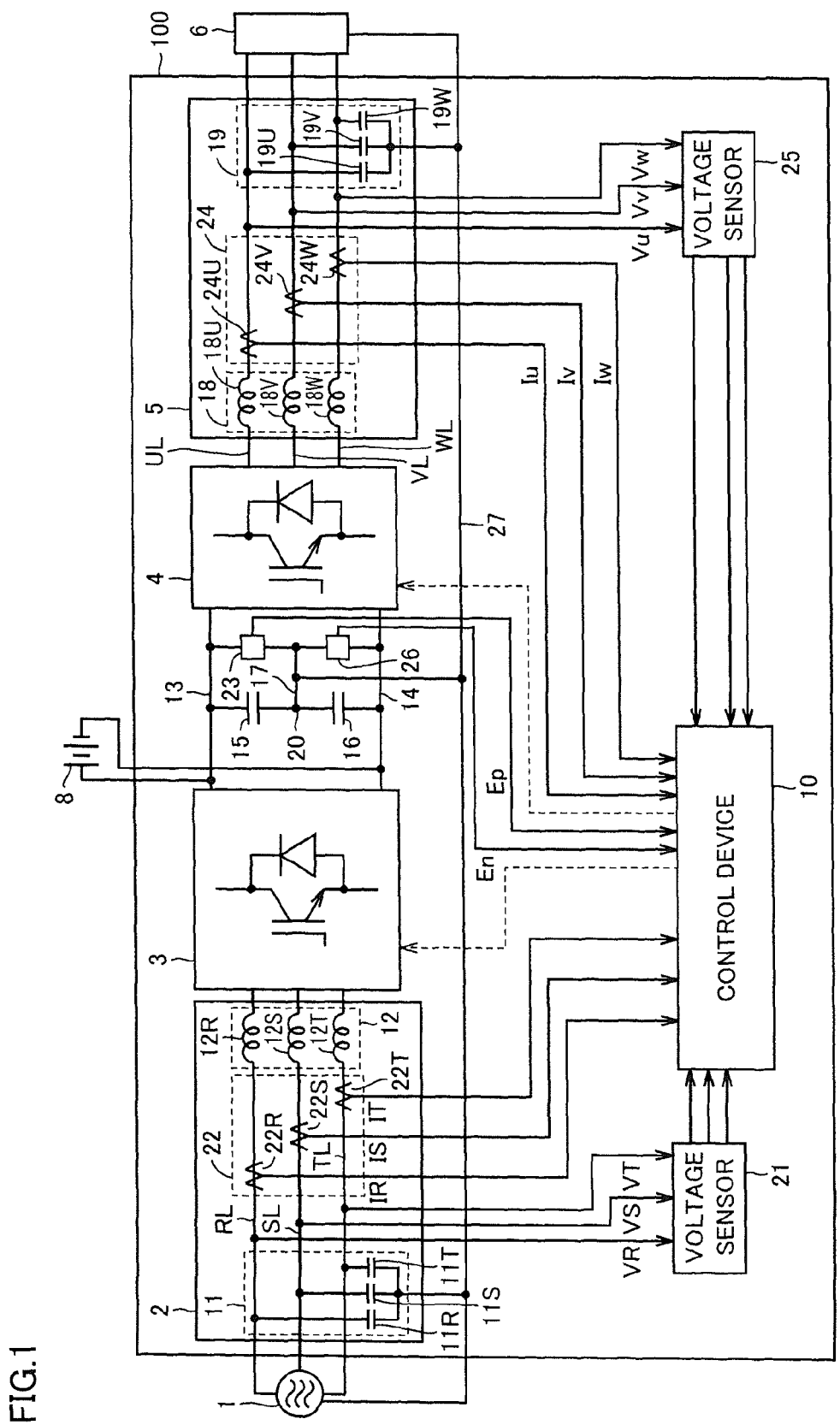
FIG. 1 schematically shows a configuration of a power supply apparatus according to a first embodiment of the present invention.

FIG. 1 schematically shows a configuration of a power supply apparatus according to a first embodiment of the present invention.

With reference to FIG. 1, an uninterruptible power supply 100 includes an input filter 2, a converter 3, an inverter 4, an output filter 5, a control device 10, a direct current (dc) positive line 13, a dc negative line 14, capacitors 15 and 16, a neutral point line 17, a ground line 27, an R phase line RL, an S phase line SL, a T phase line TL, a U phase line UL, a V phase line VL, and a W phase line WL. Uninterruptible power supply 100 further includes voltage sensors 21, 23, 25 and 26, and current sensors 22 and 24.

A commercial ac power supply 1 supplies three phase ac voltage, and a potential for ground line 27. An ac load 6 is a load of a three-phase four-wire system.

Input filter 2 prevents commercial ac power supply 1 from receiving a harmonic component. Input filter 2 is a three phase LC filter circuit configured of a capacitor 11 (capacitors 11R, 11S and 11T) and a reactor 12 (reactors 12R, 12S and 12T).

Converter 3 receives three phase ac power from commercial ac power supply 1 via input filter 2, converts the ac power into dc power, and supplies the dc power to inverter 4 via dc positive line 13 and dc negative line 14. Inverter 4 receives the dc power from converter 3 and converts the dc power into three phase ac power. Converter 3 and inverter 4 are connected via dc positive line 13 and dc negative line 14.

Capacitors 15 and 16 are connected between dc positive line 13 and dc negative line 14 in series and smooth voltage between dc positive line 13 and dc negative line 14. Capacitors 15 and 16 are connected at a node, i.e., a neutral point 20, which has neutral point line 17 connected thereto. Neutral point line 17 is connected to ground line 27.

Inverter 4 outputs the ac power which is in turn supplied via output filter 5 to ac load 6. Output filter 5 removes a harmonic component generated as inverter 4 operates. Output filter 5 is a three phase LC filter circuit configured of a reactor 18 (reactors 18U, 18V and 18W) and a capacitor 19 (capacitors 19U, 19V and 19W).

A storage battery 8 is connected between dc positive line 13 and dc negative line 14. In the present embodiment, storage battery 8 is external to uninterruptible power supply 100. Storage battery 8 may be incorporated in uninterruptible power supply 100.

Voltage sensor 21 senses voltage VR on the R phase line, voltage VS on the S phase line, and voltage VT on the T phase line, and outputs a three phase voltage signal representative of voltages VR, VS and VT to control device 10. Current sensor 22 includes current sensors 22R, 22S and 22T. Current sensor 22R senses current IR on R phase line RL. Current sensor 22S senses current IS on S phase line SL. Current sensor 22T senses current IT on T phase line TL. Current sensor 22 outputs a three phase current signal representative of voltages IR, IS and IT to control device 10.

Voltage sensor 23 senses voltage Ep between dc positive line 13 and neutral point line 17 and outputs a signal representative of voltage Ep to control device 10. Voltage sensor 26 senses voltage En between dc negative line 14 and neutral point line 17 and outputs a signal representative of voltage En to control device 10. Note that (Ep+En)=E. Dc voltage E is held constant. Voltage Ep and voltage En are both held at E/2.

Voltage sensor 25 senses voltage Vu on the U phase line, voltage Vv on the V phase line, and voltage Vw on the W phase line, and outputs a three phase voltage signal representative of voltages Vu, Vv and Vw to control device 10. Current sensor 24 includes current sensors 24U, 24V and 24W. Current sensor 24U senses current Iu on U phase line UL. Current sensor 24V senses current Iv on V phase line VL. Current sensor 24W senses current Iw on W phase line WL. Current sensor 24 outputs a three phase current signal representative of voltages Iu, Iv and Iw to control device 10.

Control device 10 controls how converter 3 and inverter 4 operate. As will be described hereinafter more specifically, converter 3 and inverter 4 are configured of a semiconductor switching element. In the present embodiment, the semiconductor switching element is an insulated gate bipolar transistor (IGBT). In the present embodiment, the semiconductor switching element is controlled in accordance with a pulse width modulation (PWM) method. Control device 10 receives a three phase voltage signal from each of voltage sensors 21 and 25, a three phase current signal from each of current sensors 22 and 24, and signals from voltage sensors 23 and 26, and performs the PWM control. Control device 10 is implemented for example by a microcomputer executing a prescribed program.

Figure 2:
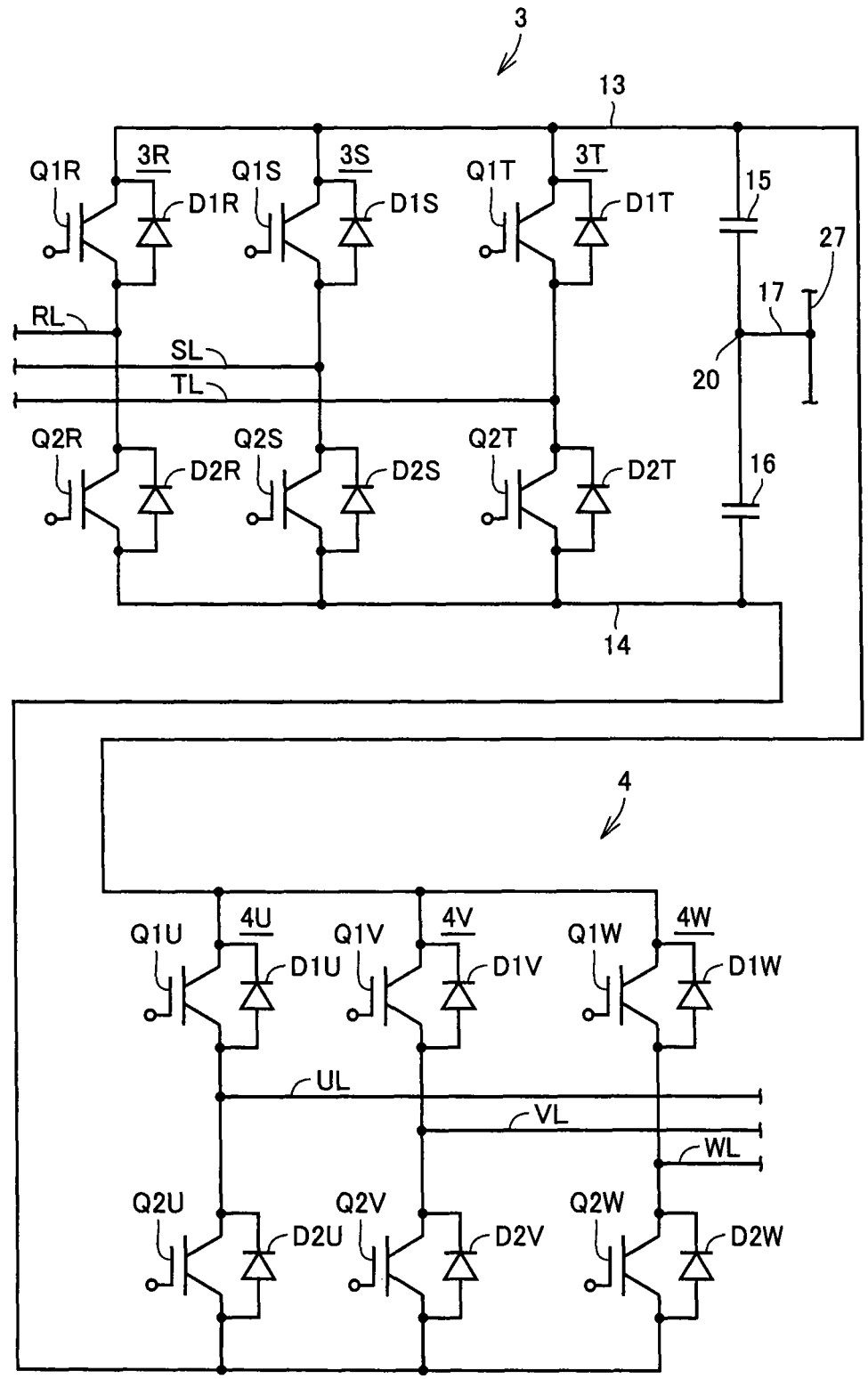
FIG. 2 is a circuit diagram for specifically illustrating a configuration of a converter 3 and an inverter 4 shown in FIG. 1.

FIG. 2 is a circuit diagram for specifically illustrating a configuration of converter 3 and inverter 4 shown in FIG. 1. With reference to FIG. 2, converter 3 includes an R phase arm 3R, an S phase arm 3S, and a T phase arm 3T. R phase arm 3R includes IGBT devices Q1R and Q2R, and diodes D1R and D2R. S phase arm 3S includes IGBT devices Q1S and Q2S, and diodes D1S and D2S. T phase arm 3T includes IGBT devices Q1T and Q2T, and diodes D1T and D2T.

R phase line RL is connected to a node of IGBT devices Q1R and Q2R. S phase line SL is connected to a node of IGBT devices Q1S and Q2S. T phase line TL is connected to a node of IGBT devices Q1T and Q2T.

Inverter 4 includes a U phase arm 4U, a V phase arm 4V, and a W phase arm 4W. U phase arm 4U includes IGBT devices Q1U and Q2U, and diodes D1U and D2U. V phase arm 4V includes IGBT devices Q1V and Q2V, and diodes DIV and D2V. W phase arm 4W includes IGBT devices Q1W and Q2W, and diodes D1W and D2W.

U phase line UL is connected to a node of IGBT devices Q1U and Q2U. V phase line VL is connected to a node of IGBT devices Q1V and Q2V. W phase line WL is connected to a node of IGBT devices Q1W and Q2W.

The two IGBT devices included in each arm are connected between dc positive line 13 and dc negative line 14 in series. Each diode is connected in antiparallel to an IGBT device associated therewith.

The remainder shown in FIG. 2 is also shown in FIG. 1, and accordingly, will not be described repeatedly in detail.

Figure 3:
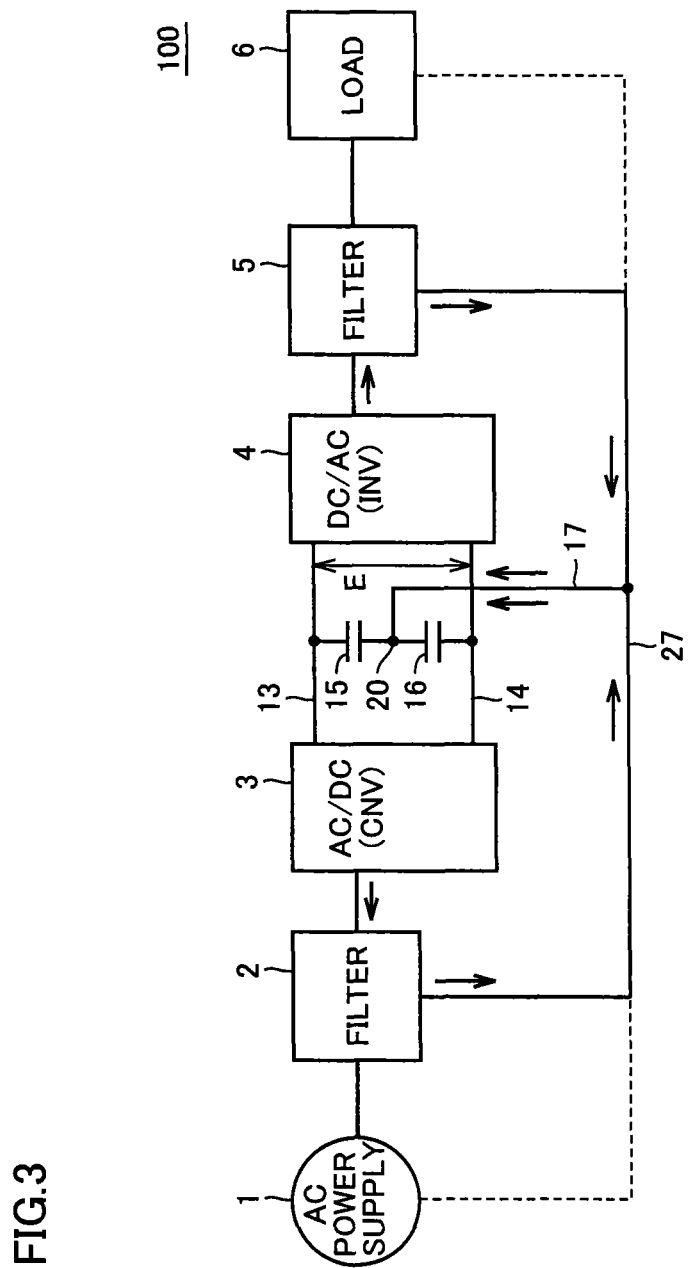
FIG. 3 schematically shows a configuration of a main circuit of an uninterruptible power supply 100.

Hereinafter how uninterruptible power supply 100 operates will be described. FIG. 3 schematically shows a configuration of a main circuit of uninterruptible power supply 100. With reference to FIG. 3, commercial ac power supply 1 supplies three phase ac voltage, and a potential for ground line 27. The three phase ac voltage supplied from commercial ac power supply 1 is supplied via filter 2 to converter 3. Converter 3 converts the three phase ac voltage into dc voltage.

Capacitors 15 and 16 configure a dc circuit. The PWM control allows converter 3 to hold dc voltage E between dc positive line 13 and dc negative line 14 constant. The PWM control allows inverter 4 to convert dc voltage E into three phase ac voltage. Inverter 4 is controlled in response to a voltage command value. Inverter 4 outputs a three phase alternating current, which is in turn supplied via filter 5 to ac load 6.

When the above electric power conversion is performed, a zero phase harmonic component flows from converter 3 into filter 2, as indicated by an arrow. The zero phase harmonic component is composition of harmonic components of the three phases. Converter 3 outputs the zero phase harmonic component, which is in turn flows through filter 2 and then on ground line 27 to neutral point 20. Similarly, as indicated by an arrow, a zero phase harmonic component flows from inverter 4 into filter 5. Inverter 4 outputs the zero phase harmonic component, which in turn flows through filter 5 and then on ground line 27 to neutral point 20.

Figure 4:
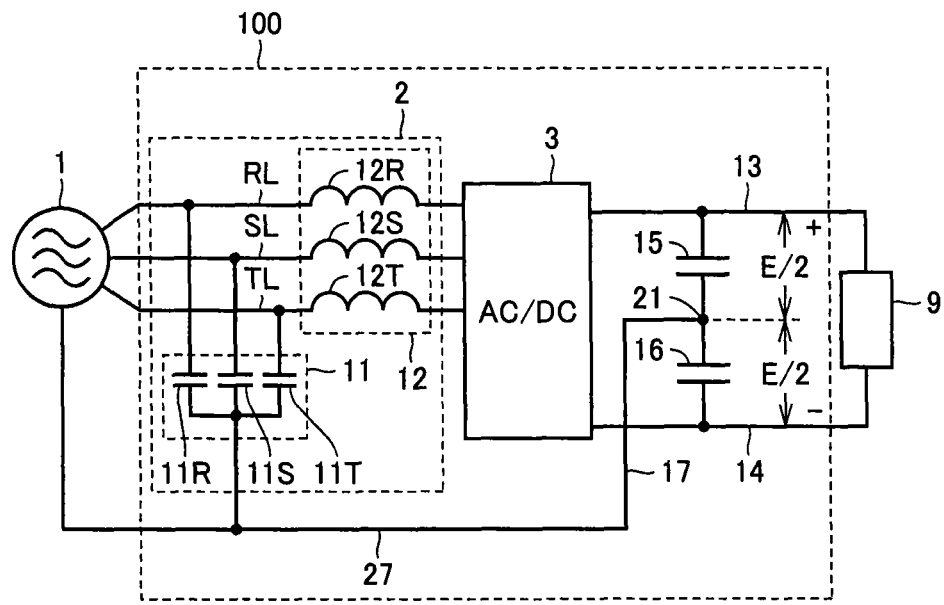
FIG. 4 schematically shows a state with the converter used alone.

FIG. 4 schematically shows a state with the converter used alone. With reference to FIG. 4, converter 3 outputs dc power, which is supplied to a dc load 9. In place of dc load 9, storage battery 8 may be connected to an output terminal of converter 3. Inverter 4 ceases its operation.

The voltage between dc positive line 13 and neutral point 20 is +E/2. The voltage between neutral point 20 and dc negative line 14 is +E/2. Accordingly, the voltage between dc positive line 13 and dc negative line 14 is E. To hold dc voltage E constant, converter 3 operates, as PWM-controlled.

Figure 5:
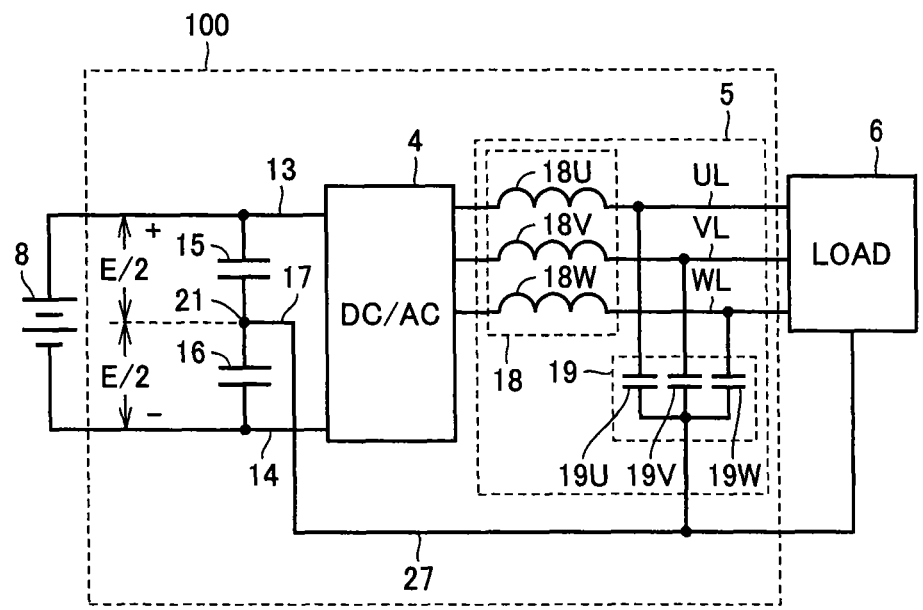
FIG. 5 schematically shows a state with the inverter used alone.

FIG. 5 schematically shows a state with the inverter used alone. With reference to FIG. 5, for example a power failure occurs, and converter 3 cannot receive ac power from commercial ac power supply 1. In that case, converter 3 ceases its operation. For example, dc power is supplied from storage battery 8 to inverter 4. Inverter 4 is PWM-controlled to convert the dc power into ac power.

Figure 6:
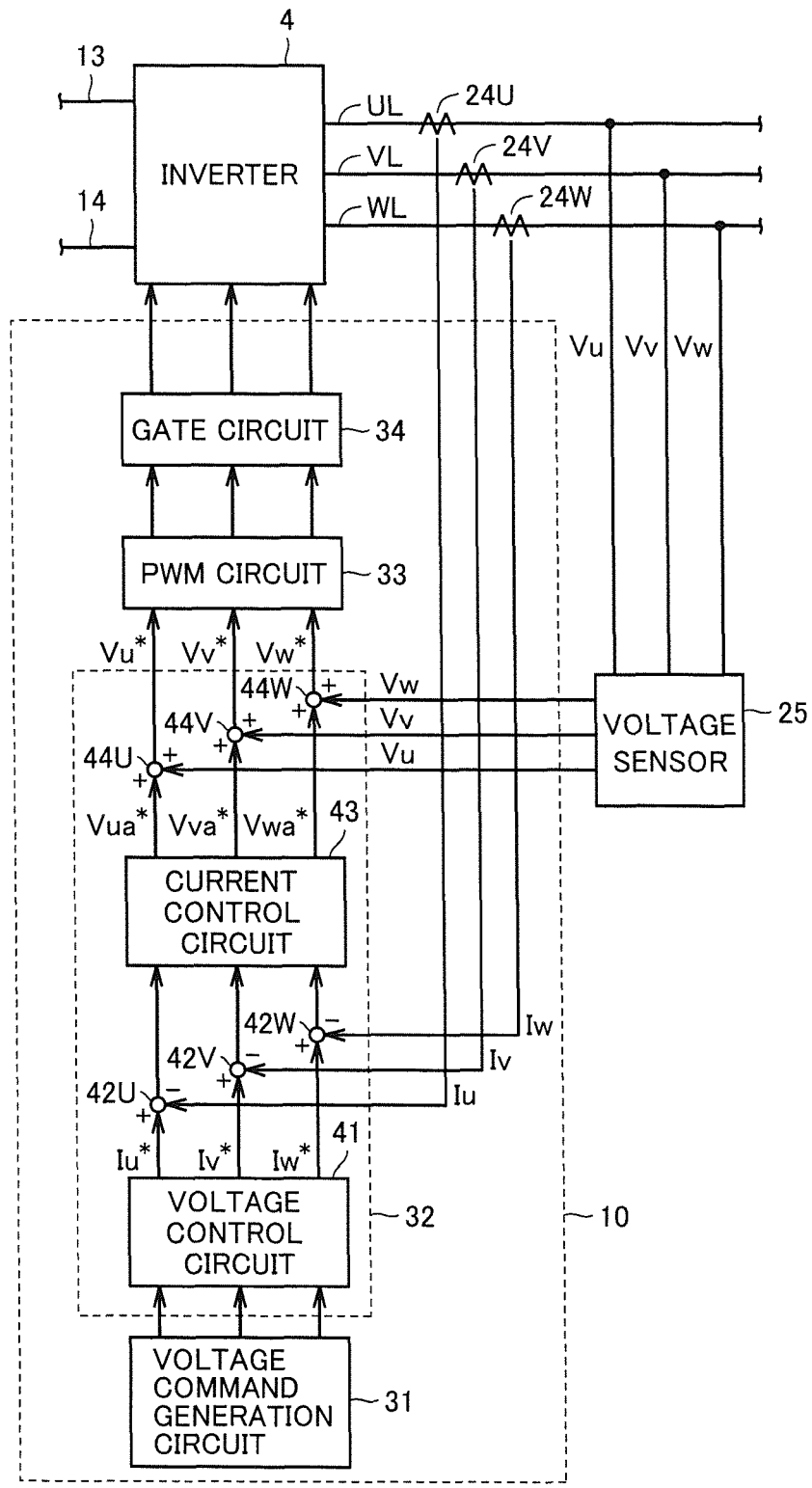
FIG. 6 is a functional block diagram illustrating one example of a configuration for controlling the inverter.

FIG. 6 is a functional block diagram illustrating one example of a configuration for controlling the inverter. With reference to FIG. 6, control device 10 includes a voltage command generation circuit 31, a control unit 32, a PWM circuit 33, and a gate circuit 34. Control unit 32 includes a voltage control circuit 41, subtractors 42U, 42V and 42W, a current control circuit 43, and adders 44U, 44V and 44W.

Voltage command generation circuit 31 generates a voltage command value for each of the U phase, the V phase and the W phase. The voltage command value is represented by a sinusoidal wave signal. A sinusoidal wave has a frequency corresponding to that of ac voltage.

Voltage control circuit 41 operates in response to the voltage command value received from voltage command generation circuit 31 (for the U phase, the V phase, and the W phase) to generate current command values Iu*, Iv* and Iw*. Current command values Iu*, Iv* and Iw* are associated with the U phase, the V phase, and the W phase, respectively.

Subtractor 42U generates a difference between current command value Iu* and a current value Iu. Subtractor 42V generates a difference between current command value Iv* and a current value Iv. Subtractor 42W generates a difference between current command value Iw* and a current value Iw. Current values Iu, Iv and Iw are sensed by current sensors 24U, 24V and 24W, respectively.

Current control circuit 43 generates a voltage command value Vua* based on the difference between current command value Iu and current value Iu. Current control circuit 43 generates a voltage command value Vva* based on the difference between current command value Iv* and current value Iv. Current control circuit 43 generates a voltage command value Vwa* based on the difference between current command value Iw* and current value Iw.

Adder 44U adds voltage command value Vua* and a voltage value Vu together. Adder 44V adds voltage command value Vva* and a voltage value Vv together. Adder 44W adds voltage command value Vwa* and a voltage value Vw together. Voltage values Vu, Vv and Vw are sensed by voltage sensor 25.

A voltage command value Vu* is an output of adder 44U. A voltage command value Vv* is an output of adder 44V. A voltage command value Vw* is an output of adder 44W.

PWM circuit 33 operates in response to voltage command values Vu*, Vv* and Vw* to generate a PWM control signal for controlling the arm of each of the U phase, the V phase, and the W phase. Gate circuit 34 operates in response to the PWM control signal for each phase to generate a signal for controlling the two switching elements included in each arm of inverter 4.

Figure 7:
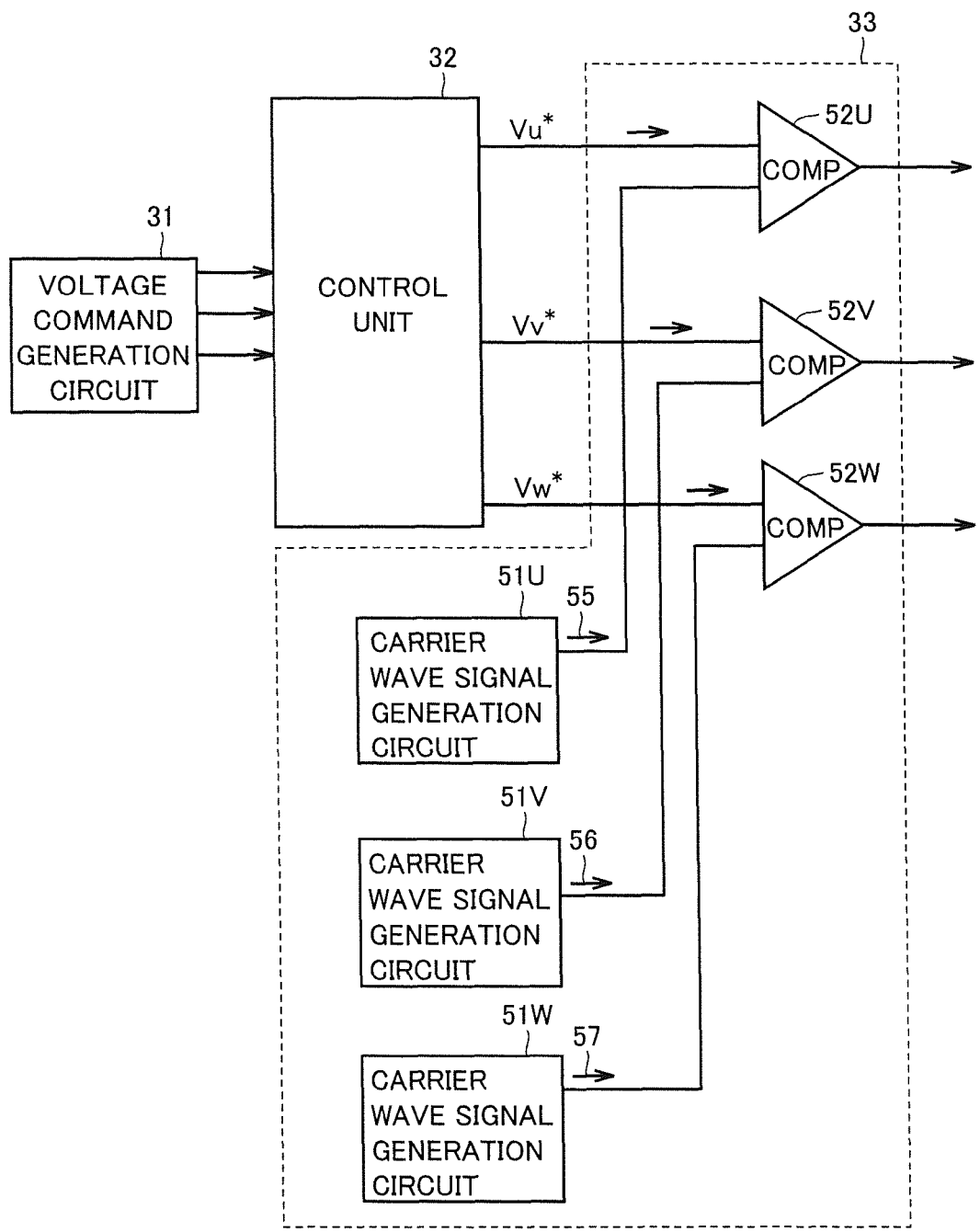
FIG. 7 is a functional block diagram of a PWM circuit shown in FIG. 6.

FIG. 7 is a functional block diagram of the PWM circuit shown in FIG. 6. With reference to FIG. 7, PWM circuit 33 includes carrier wave signal generation circuits 51U, 51V and 51W, and comparators 52U, 52V and 52W.

Carrier wave signal generation circuits 51U, 51V and 51W generate a carrier wave signal. The carrier wave signal is a signal for determining a switching cycle of a switching element included in the inverter. In general, a carrier wave is implemented as a triangular wave. In the present embodiment, the carrier wave signal is a triangular wave. Carrier wave signal generation circuits 51U, 51V and 51W for example follow a function that is preset for each to generate a triangular wave. Carrier wave signal generation circuits 51U, 51V and 51W generate carrier wave signals 55, 56 and 57, respectively.

Comparator 52U compares voltage command value Vu* with carrier wave signal 55 and outputs a PWM control signal for the U phase. Comparator 52V compares voltage command value Vv* with carrier wave signal 56 and outputs a PWM control signal for the V phase. Comparator 52W compares voltage command value Vw* with carrier wave signal 57 and outputs a PWM control signal for the W phase. Each PWM control signal is a rectangular wave signal.

Figure 8:
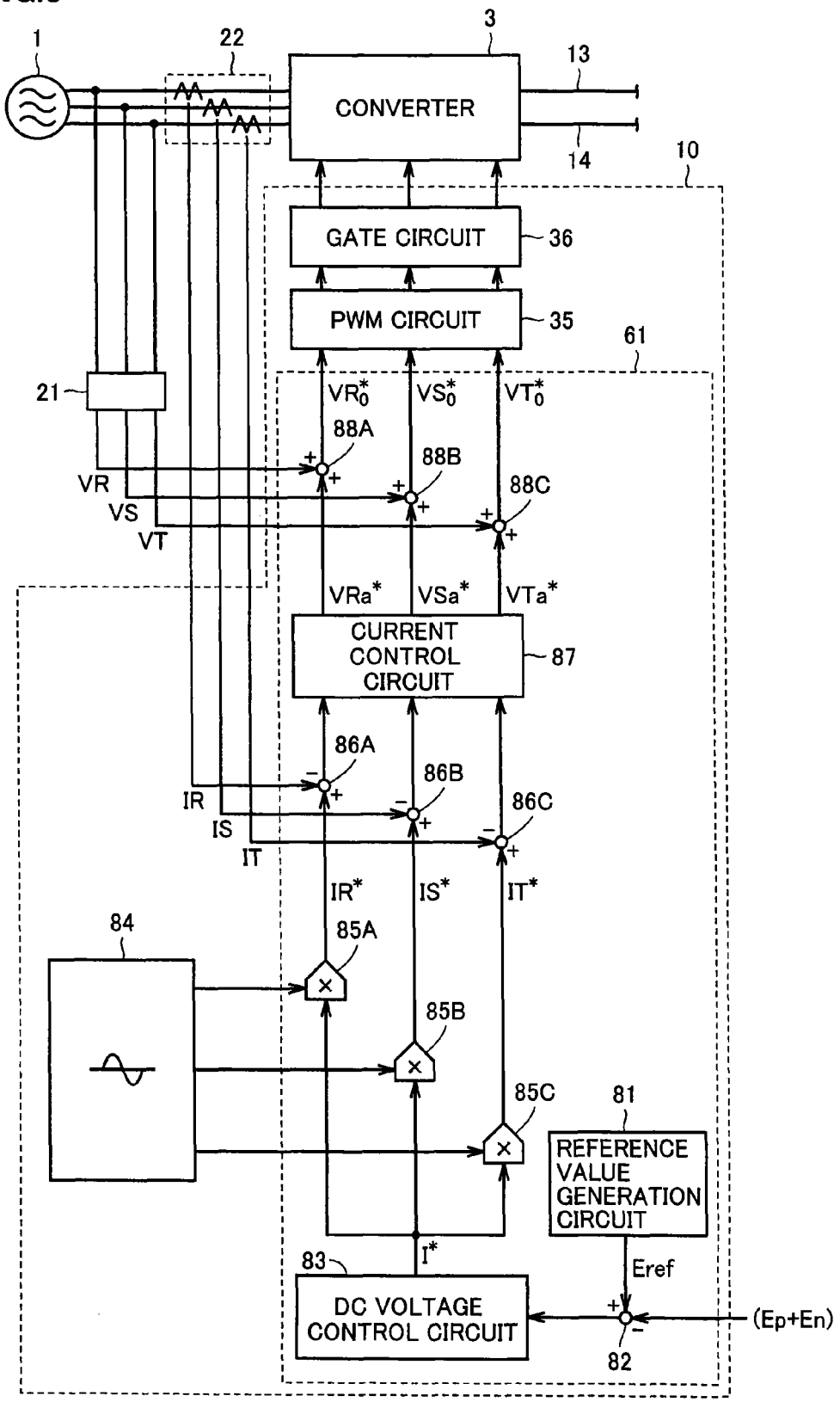
FIG. 8 is a functional block diagram illustrating one example of a configuration for controlling the converter.

FIG. 8 is a functional block diagram illustrating one example of a configuration for controlling the converter. With reference to FIG. 8, control device 10 includes a sinusoidal wave generation circuit 84, a voltage command generation circuit 61, a PWM circuit 35, and a gate circuit 36. Voltage command generation circuit 61 includes a reference value generation circuit 81, subtractors 82, 86A-86C, a dc voltage control circuit 83, multipliers 85A-85C, and a current control circuit 87.

Reference value generation circuit 81 generates a reference value Eref to serve as a reference value for voltage value (Ep+En). Voltage value (Ep+En) is a sum of a value of voltage Ep sensed by voltage sensor 23 and voltage En sensed by voltage sensor 26. Subtractor 82 calculates a difference between reference value Eref and voltage value (Ep+En). Dc voltage control circuit 83 calculates a current command value I* to provide a difference of zero between reference value Eref and voltage value (Ep+En) for controlling a current flowing to an input of converter 3. Dc voltage control circuit 83 for example provides a proportional or proportional plus integral operation of an error of the reference value and a sensed voltage value to calculate current command value I*.

Sinusoidal wave generation circuit 84 outputs a sinusoidal wave signal in phase with R phase voltage of commercial ac power supply 1, a sinusoidal wave signal in phase with S phase voltage of commercial ac power supply 1, and a sinusoidal wave signal in phase with T phase voltage of commercial ac power supply 1. The three sinusoidal wave signals are input to multipliers 85A-85C, respectively, and multiplied by current command value I*. This generates current command values IR*, IS and IT* in phase with a phase voltage of commercial ac power supply 1.

Subtractor 86A calculates a difference between current command value IR* and an R phase current IR sensed by current sensor 22. Subtractor 86B calculates a difference between current command value IS* and an S phase current IS sensed by current sensor 22. Subtractor 86C calculates a difference between current command value IT* and a T phase current IT sensed by current sensor 22.

Current control circuit 87 generates voltage command values VRa*, VSa and VTa* so that the difference between current command value IR* and R phase current IR, that between current command value IS* and S phase current IS, and that between current command value IT* and T phase current IT are all zero. Current control circuit 87 for example subjects a difference between a current command value and a value of a current sensed by a current sensor to proportional or proportional plus integral control to amplify the difference to generate a voltage command value.

Adder 88A adds voltage command value VRa* and an R phase voltage VR sensed by voltage sensor 21 together to generate a voltage command value $VR_0^*$. Adder 88B adds voltage command value VSa* and an S phase voltage VS sensed by voltage sensor 21 together to generate a voltage command value $VS_0^*$. Adder 88C adds voltage command value VTa* and a T phase voltage VT sensed by voltage sensor 21 together to generate a voltage command value $VT_0^*$.

PWM circuit 35 operates in response to voltage command values $VR_0^*$, $VS_0^*$ and $VT_0^*$ to generate a PWM control signal for each of the R phase, the S phase, and the T phase. Gate circuit 36 operates in response to the PWM control signal for each phase to generate a signal for controlling the two switching elements included in each arm of converter 3.

Figure 9:
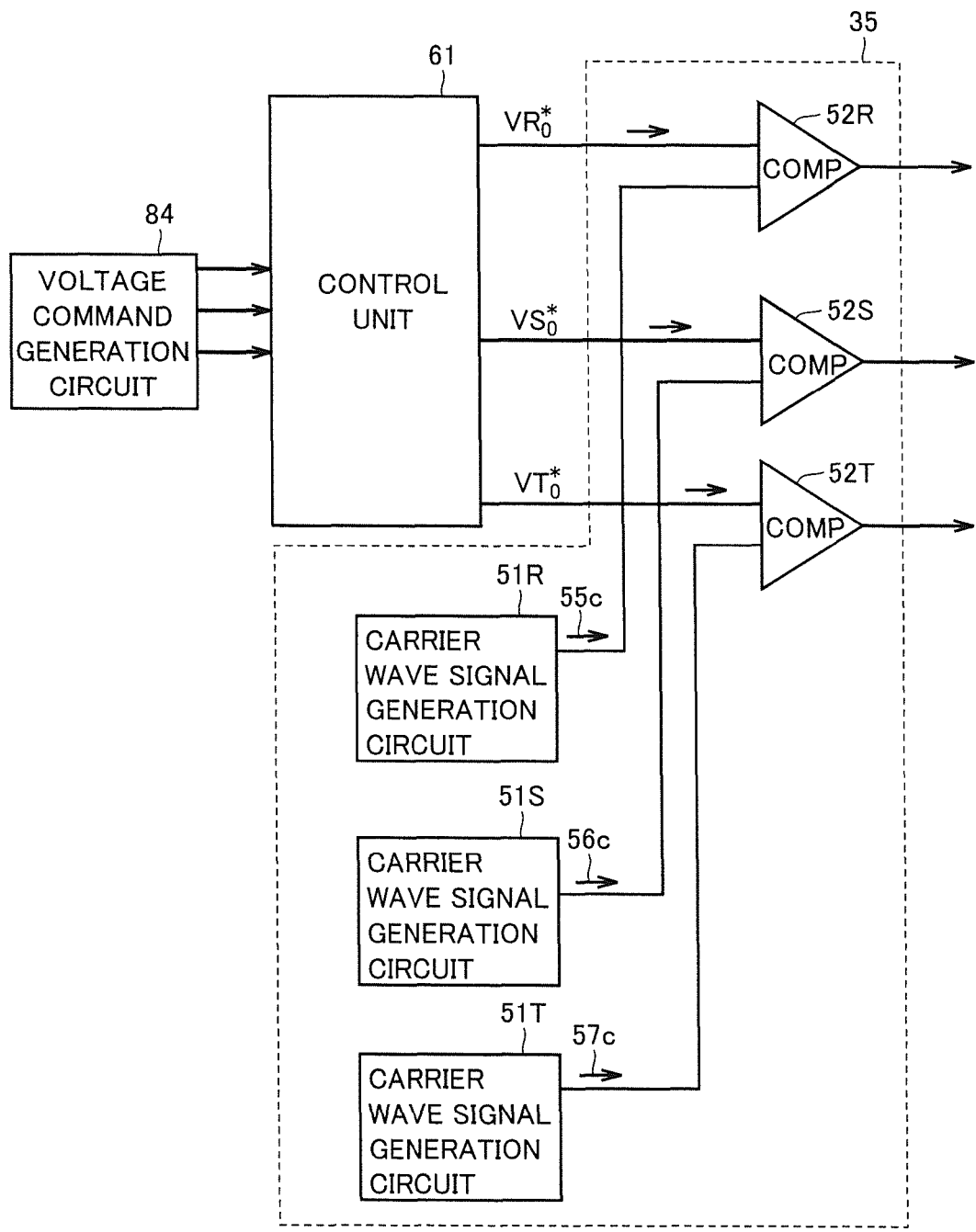
FIG. 9 is a functional block diagram of a PWM circuit shown in FIG. 8.

FIG. 9 is a functional block diagram of the PWM circuit shown in FIG. 8. With reference to FIG. 9, PWM circuit 35 includes carrier wave signal generation circuits 51R, 51S and 51T, and comparators 52R, 52S and 52T.

Carrier wave signal generation circuits 51R, 51S and 51T for example follow a function that is preset for each to generate a triangular wave. Carrier wave signal generation circuits 51R, 51S and 51T generate carrier wave signals 55c, 56c and 57c, respectively. Carrier wave signals 55c, 56c and 57c can have a phase difference set as desired.

Comparator 52R compares voltage command value $VR_0^*$ with carrier wave signal 55A and outputs a PWM control signal for the R phase. Comparator 52S compares voltage command value $VS_0$ with carrier wave signal 56A and outputs a PWM control signal for the S phase. Comparator 52T compares voltage command value $VT_0^*$ with carrier wave signal 57A and outputs a PWM control signal for the T phase.

Figures 10, 11:
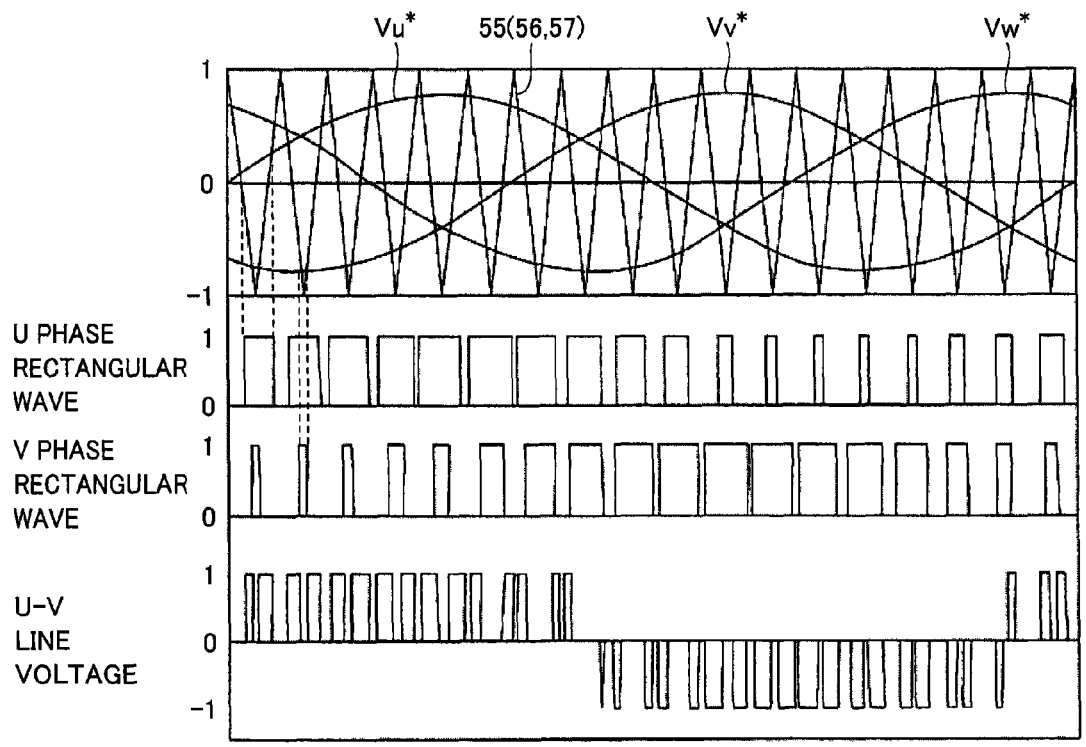
FIG. 10 is a waveform diagram for illustrating an example of controlling the inverter, as studied by the present inventors.
FIG. 11 is a diagram for illustrating an association of a state of a switching element for each phase and voltage vector.

FIG. 10 is a waveform diagram for illustrating an example of controlling the inverter, as studied by the present inventors. With reference to FIG. 10, voltage command values Vu*, Vv* and Vw* are command values for ac voltage. Each voltage command value is represented by a sinusoidal wave. Voltage command values Vu*, Vv* and Vw* are out of phase from each other by 120 degrees.

Carrier wave signals 55, 56 and 57 have mutually equal phases. FIG. 10 represents carrier wave signals 55-57 as a single carrier wave signal.

The carrier wave signal's value is compared with the voltage command values. This generates a PWM control signal. The PWM control signal is a rectangular wave signal. The rectangular wave signal has a value of 1 for a period of time for which a voltage command value is larger than the value of carrier wave signal 55. The rectangular wave signal has a value of 0 for a period of time for which a voltage command value is smaller than the value of carrier wave signal 55. As one example, FIG. 10 represents a U phase rectangular wave signal, a V phase rectangular wave signal, and U-V line voltage. The sinusoidal wave representing the voltage command value has a frequency of ac voltage (e.g., 60 Hz or 50 Hz). Carrier wave signal 55 has a frequency significantly larger than that of ac voltage, e.g., 1-10 kHz.

Figure 12:
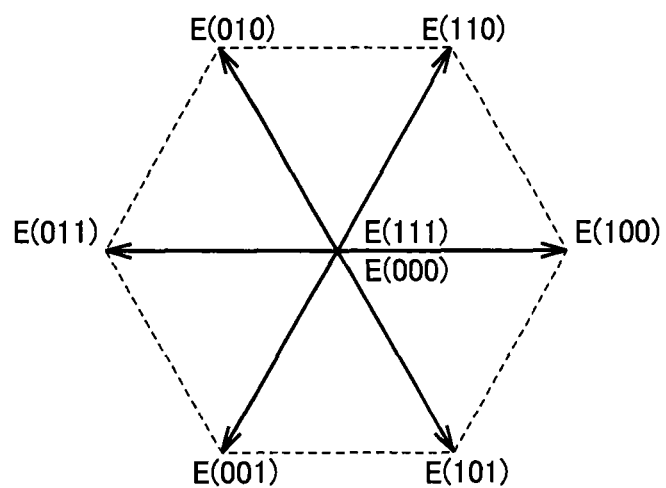
FIG. 12 is a diagram for illustrating voltage vector.

FIG. 11 is a diagram for illustrating an association of a state of a switching element of each phase and voltage vector. FIG. 12 is a diagram for illustrating voltage vector. With reference to FIG. 11 and FIG. 12, a switching element assuming a state of "1" means that a switching element on the positive side (Q1U, Q1V, Q1W) is turned on and a switching element on the negative side (Q2U, Q2V, Q2W) is turned off. A switching element assuming a state of "0" means a state opposite to that of "1". E (111) represents a voltage vector provided when the U, V and W phase switching elements all assume the state of "1." E (000) represents a voltage vector provided when the U, V and W phase switching elements all assume the state of "0." The zero phase component is largest for voltage vector E (111) or E (000).

Figure 13:
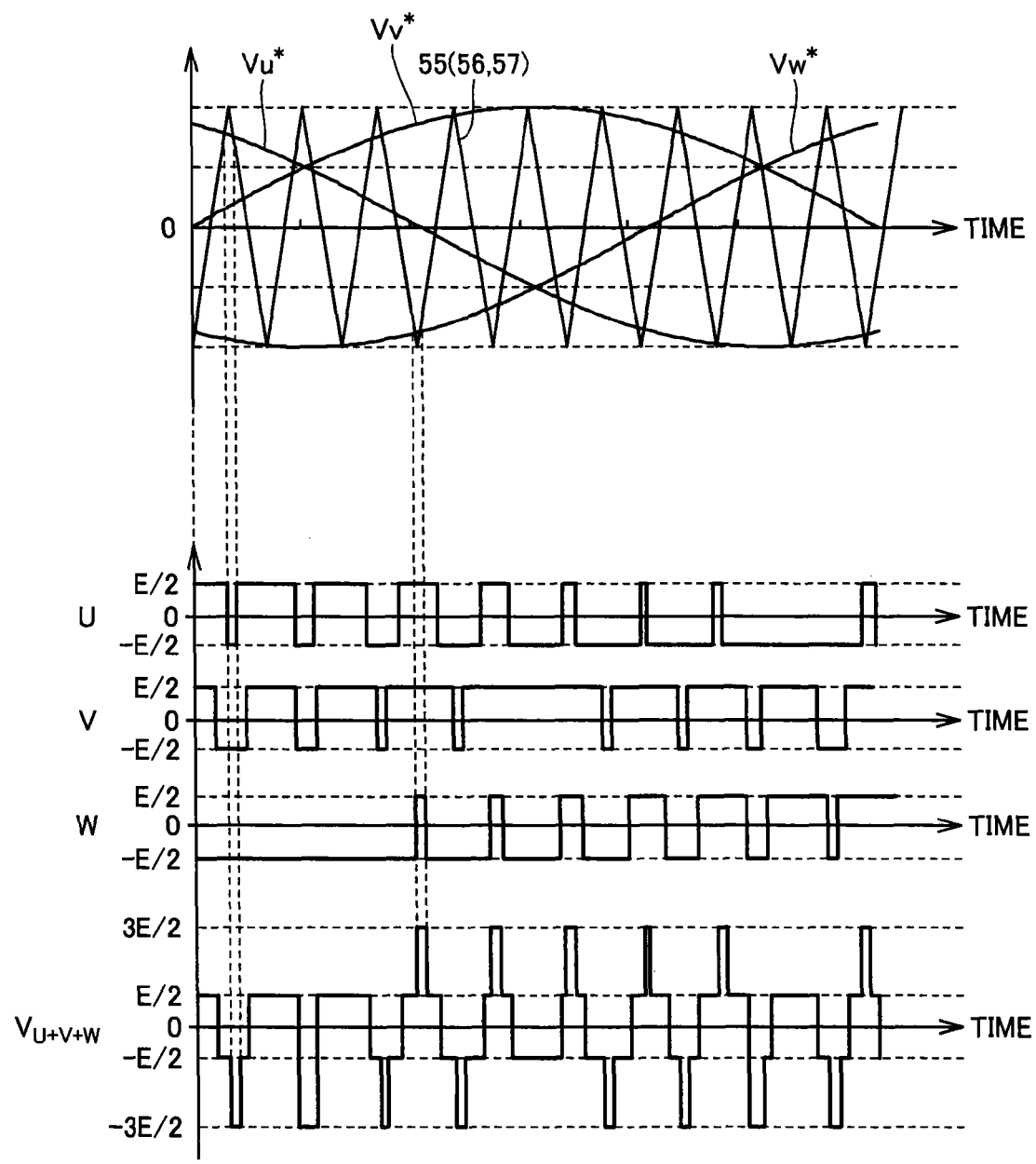
FIG. 13 is a diagram for illustrating a voltage of each of a U phase, a V phase and a W phase, and a zero phase voltage.

FIG. 13 is a diagram for illustrating a voltage of each of the U phase, the V phase and the W phase, and a zero phase voltage. With reference to FIG. 13, carrier wave signals 55-57 corresponding to voltage command values Vu*, Vv* and Vw*, respectively, have mutually equal phases. Accordingly, as well as FIG. 10, FIG. 13 also represents carrier wave signals 55-57 as a single carrier wave signal.

When voltage command value Vu* is larger than the value of carrier wave signal 55, a voltage of E/2 is output on U phase line UL. For voltage command value Vu* having a negative value, when voltage command value Vu* is larger in absolute value than carrier wave signal 55b a voltage of E/2 is output on U phase line UL. Voltage output on each of V phase line VL and the W phase line is also determined according to the above described relationship between a voltage command value and a value of a carrier wave signal.

When the carrier wave signal attains a maximum value (or a positive peak value), voltage command values Vu*, Vv* and Vw* are all smaller than that value of the carrier wave signal. At the time, voltage vector E(000) is provided.

Accordingly, the U phase voltage, the V phase voltage, and the W phase voltage are all −E/2. A zero phase component $V_{U+V+W}$ has a value, which is the U phase voltage, the V phase voltage and the W phase voltage composited together. For voltage vector E(000), zero phase component $V_{U+V+W}$ will be −3E/2.

When the carrier wave signal attains a minimum value (or a negative peak value), voltage command values Vu*, Vv* and Vw are all larger than that value of the carrier wave signal. At the time, voltage vector E(111) is provided. Accordingly, the U phase voltage, the V phase voltage, and the W phase voltage are all E/2. For voltage vector E(111), zero phase component $V_{U+V+W}$ will be +3E/2.

As shown in FIG. 13, when the carrier wave signal attains the peak value, the zero phase component increases in absolute value. For the FIG. 13 switching pattern, a large zero phase component is provided, and hence filters 2 and 5 have a large loss. Furthermore, the large zero phase component results in large common node noise.

Figure 14:
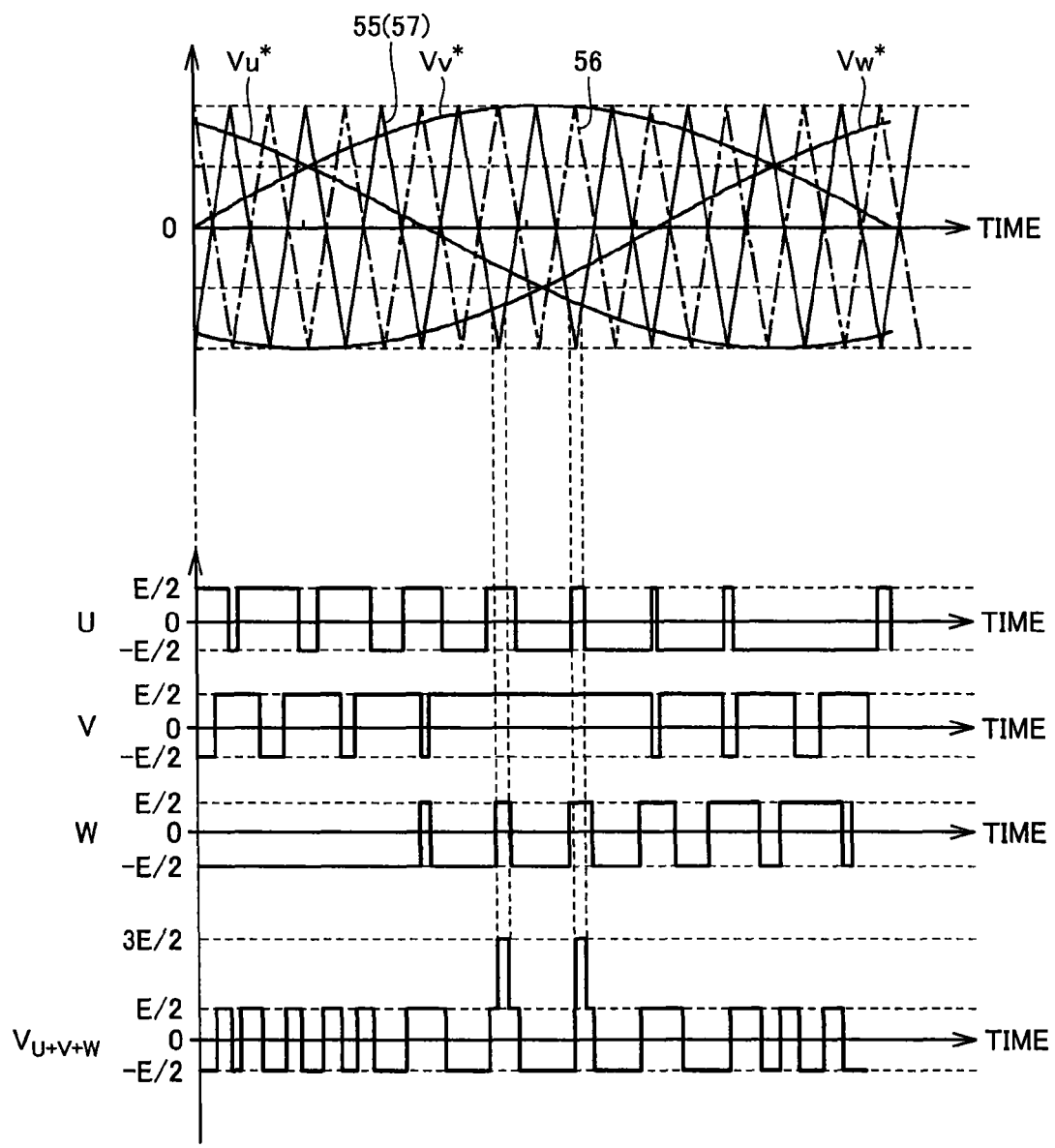
FIG. 14 is a waveform diagram for illustrating how the inverter is controlled according to the first embodiment.

FIG. 14 is a waveform diagram for illustrating how the inverter is controlled according to the first embodiment. With reference to FIG. 14, carrier wave signals 55 and 57 corresponding to voltage command values Vu and Vw, respectively, have mutually equal phases. In contrast, carrier wave signal 56 corresponding to voltage command value Vv* has a phase offset from those of carrier wave signals 55 and 57 by 180 degrees. In other words, in the present embodiment, the three carrier wave signals respectively corresponding to the three phases have one carrier wave signal with a phase inverted from those of the other two carrier wave signals.

When FIG. 13 and FIG. 14 are compared, inverting the phase of one single carrier wave signal from those of the other two carrier wave signals results in zero phase component $V_{U+V+W}$ less frequently attaining the positive peak value, or +3E/2. Furthermore, zero phase component $V_{U+V+W}$ has a negative peak value varied from −3E/2 to −E/2. This decreases zero phase component $V_{U+V+W}$ as time averaged. This can reduce a loss of filter 5 connected to the output of inverter 4. Furthermore, it can prevent increased common mode noise.

Japanese Patent Laying-Open No. 2005-051959 (PTD 2) describes that a plurality of pulsing signals corresponding to a plurality of phases have phases, respectively, offset from each other. In contrast, the first embodiment simply inverts a phase of one carrier wave signal from those of the other two carrier wave signals to provide a reduced zero phase component. Note that one carrier wave signal that has a phase inverted from those of the remaining two carrier wave signals may correspond to any one of the U phase, the V phase, and the W phase.

Second Embodiment

A second embodiment provides an uninterruptible power supply generally identical in configuration to that shown in FIG. 1. Furthermore, inverter 4 is controlled in a configuration identical to those shown in FIGS. 6 and 7.

In the second embodiment, converter 3 is PWM-controlled, as the inverter is controlled in the first embodiment. With reference to FIG. 9, PWM circuit 35 allows carrier wave signals 55c-57c to have one carrier wave signal with a phase inverted from those of the other two carrier wave signals.

The second embodiment can provide an effect similar to that of the first embodiment. In other words, simply inverting a phase of only one of three carrier wave signals from those of the other two carrier wave signals allows converter 3 to output from an ac side thereof a reduced zero phase component as time averaged. This can reduce a loss of filter 2 connected to the ac side of converter 3. Furthermore, it can prevent increased common mode noise.

Third Embodiment

A third embodiment provides an uninterruptible power supply generally identical in configuration to that shown in FIG. 1. Furthermore, inverter 4 is controlled in a configuration identical to those shown in FIGS. 6 and 7.

In the third embodiment, controlling the converter and controlling the inverter are combined to provide a further reduced zero phase component.

Figure 15:
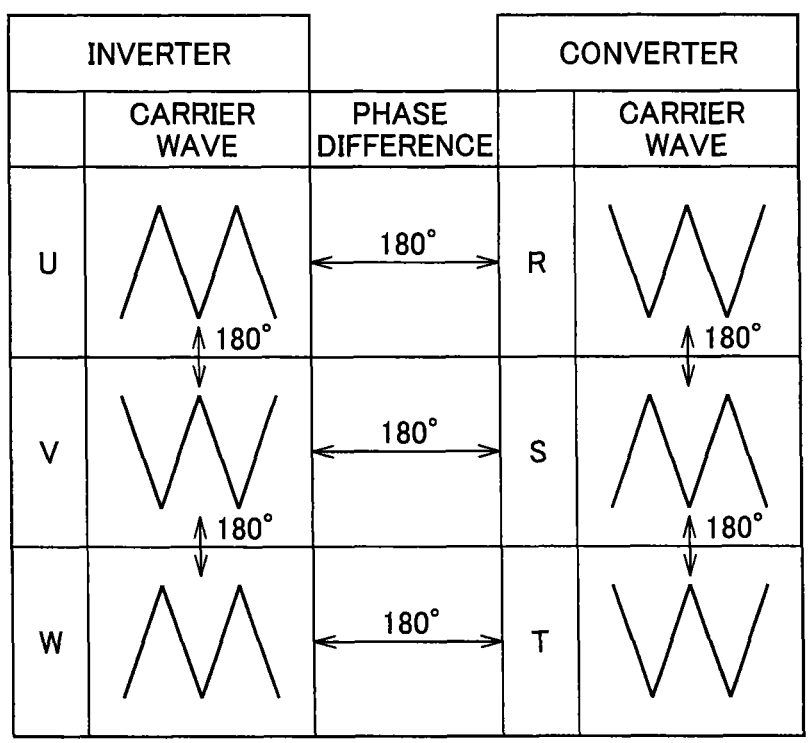
FIG. 15 is a diagram for illustrating a phase difference between three carrier wave signals used in controlling the inverter and three carrier wave signals used in controlling the converter.

FIG. 15 is a diagram for illustrating a phase difference between three carrier wave signals used in controlling the inverter and three carrier wave signals used in controlling the converter. With reference to FIG. 15, for inverter 4, three carrier wave signals have one carrier wave signal with a phase inverted from those of the other two carrier wave signals. More specifically, a carrier wave signal corresponding to the V phase has a phase offset by 180 degrees from that of a carrier wave signal corresponding to each of the U phase and the W phase.

Similarly, for converter 3, three carrier wave signals have one carrier wave signal with a phase inverted from those of the other two carrier wave signals. More specifically, a carrier wave signal corresponding to the S phase has a phase offset by 180 degrees from that of a carrier wave signal corresponding to each of the R phase and the T phase.

Herein, of the three carrier wave signals used in controlling inverter 4, the signal having a phase offset by 180 degrees from those of the other two carrier wave signals will be referred to as a first signal. Furthermore, of the three carrier wave signals used in controlling converter 3, the signal having a phase offset by 180 degrees from those of the other two carrier wave signals will be referred to as a second signal.

Specifically, the carrier wave signal corresponding to the S phase of converter 3 and the carrier wave signal corresponding to the V phase of inverter 4 have a phase difference of 180 degrees. Accordingly, the carrier wave signal corresponding to the R phase of converter 3 and the carrier wave signal corresponding to the U phase of inverter 4 have a phase difference of 180 degrees. Furthermore, the carrier wave signal corresponding to the T phase of converter 3 and the carrier wave signal corresponding to the W phase of inverter 4 have a phase difference of 180 degrees.

With six carrier wave signals generated as shown in FIG. 15, a zero phase current that flows from converter 3 via filter 2 to ground line 27 and a zero phase current that flows from inverter 4 via filter 5 to ground line 27 are opposite in sign and equal in magnitude. Thus, the zero phase currents cancel each other. The third embodiment can achieve a zero phase component furthermore reduced than the first and second embodiments.

As has been set forth above, the present embodiment only requires such a relationship that the first signal and the second signal have a phase difference of 180 degrees. Accordingly, the first signal is not limited to the carrier wave signal corresponding to the V phase and may be the carrier wave signal corresponding to the U phase or the W phase. Similarly, the second signal is not limited to the carrier wave signal corresponding to the S phase and may be the carrier wave signal corresponding to the R phase or the T phase.

Fourth Embodiment

Figure 16:
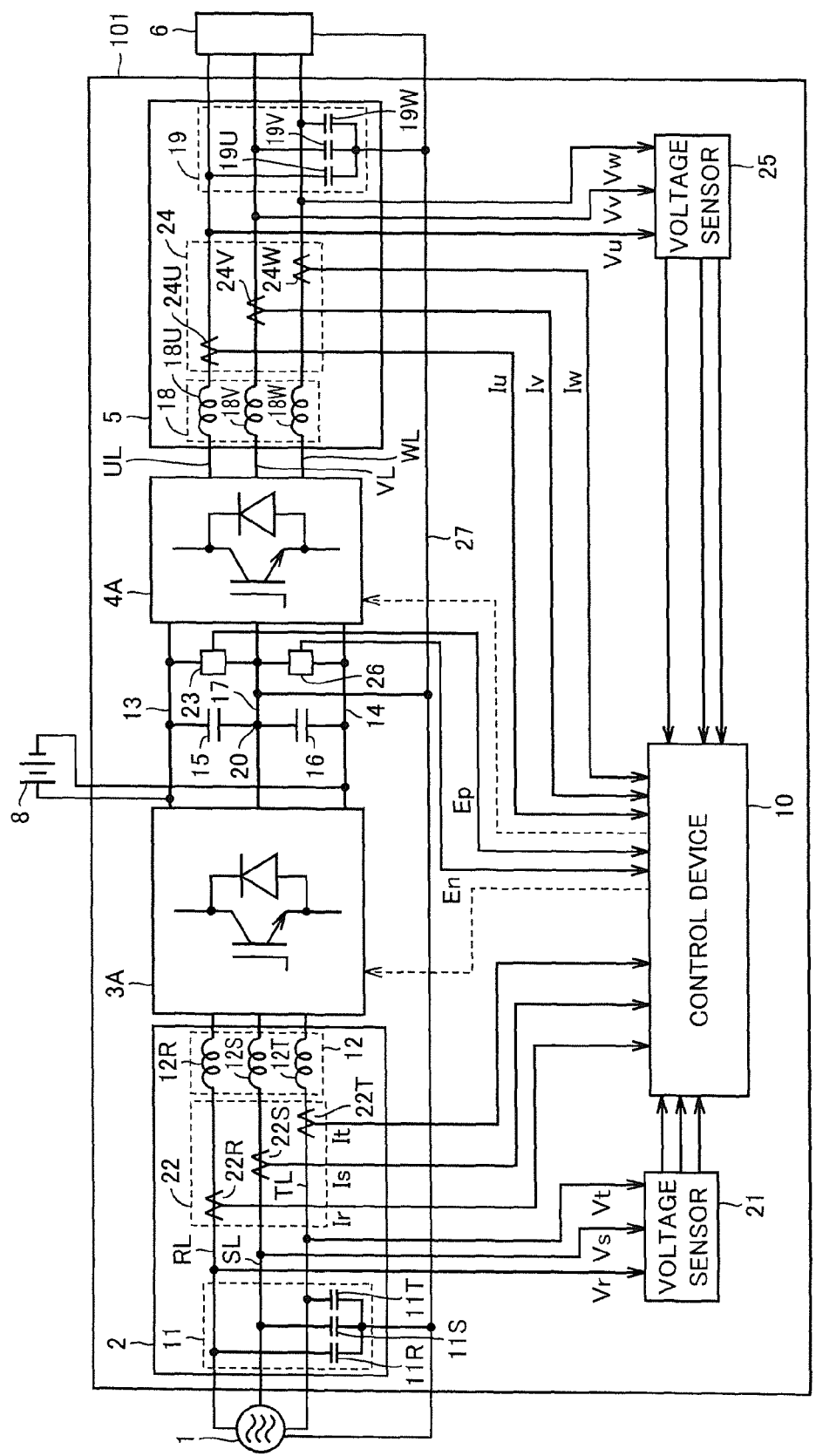
FIG. 16 schematically shows a configuration of an uninterruptible power supply including a power supply apparatus according to a fourth embodiment of the present invention.

FIG. 16 schematically shows a configuration of an uninterruptible power supply including a power supply apparatus according to a fourth embodiment of the present invention.

With reference to FIG. 1 and FIG. 16, an uninterruptible power supply 101 does not include converter 3 or inverter 4, and instead includes a converter 3A and an inverter 4A. Uninterruptible power supply 101 is different from uninterruptible power supply 100 in this regard. Converter 3A and inverter 4A are multilevel circuits. Neutral point line 17 connects converter 3A and inverter 4A. The remainder in configuration of uninterruptible power supply 101 is similar to that of uninterruptible power supply 100, and will not be described repeatedly.

Figure 17:
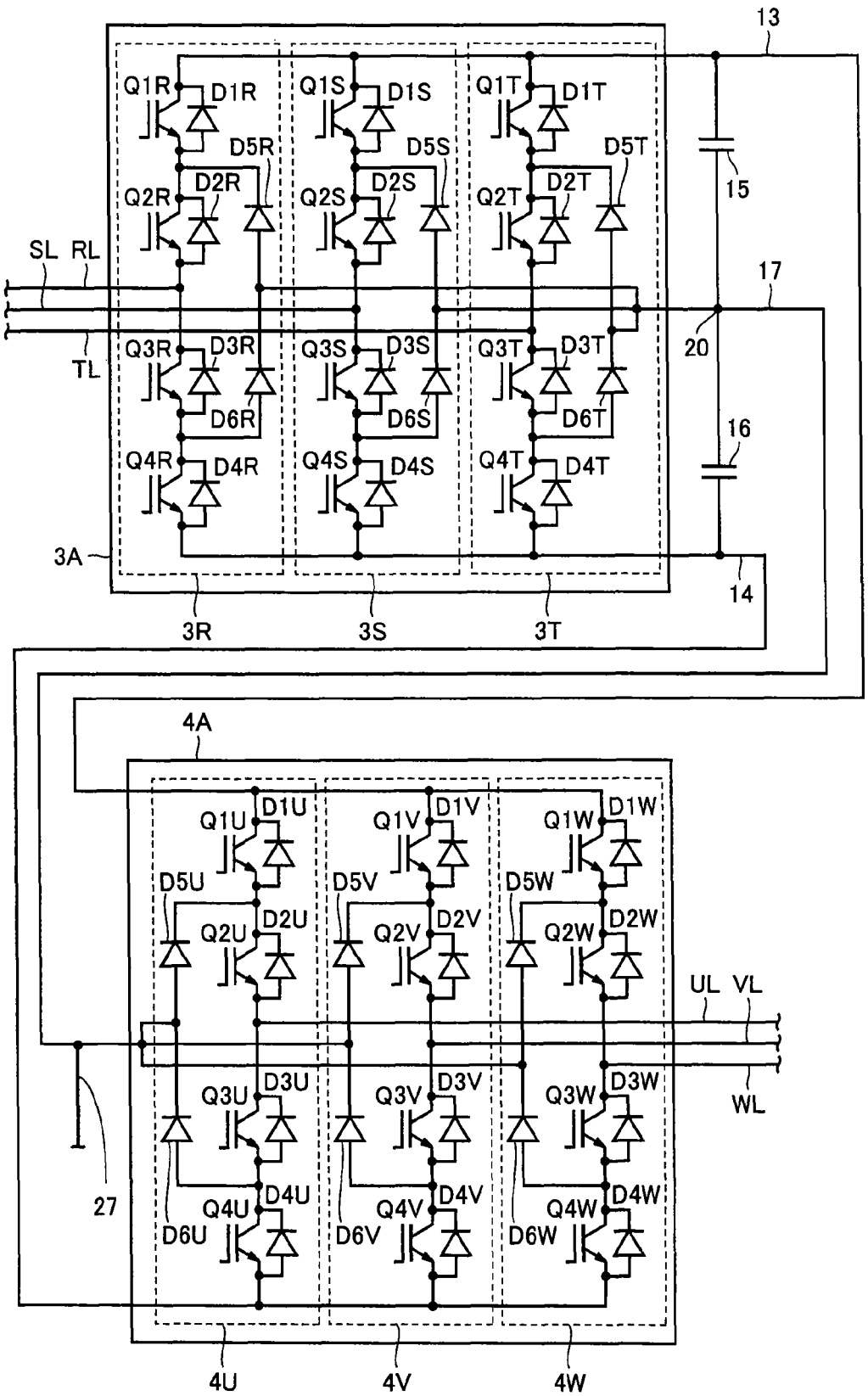
FIG. 17 is a circuit diagram for specifically illustrating a configuration of a converter 3A and an inverter 4A shown in FIG. 16.

FIG. 17 is a circuit diagram for specifically illustrating a configuration of converter 3A and inverter 4A shown in FIG. 16. With reference to FIG. 17, converter 3A includes R phase arm 3R, S phase arm 3S, and T phase arm 3T. Inverter 4A includes U phase arm 4U, V phase arm 4V, and W phase arm 4W.

Converter 3A has each phase arm (3R, 3S, 3T) configured as a 3 level circuit and including four IGBT devices and six diodes, and inverter 4A also has each phase arm (4U, 4V, 4W) configured as a 3 level circuit and including four IGBT devices and six diodes. More specifically, R phase arm 3R includes IGBT devices Q1R-Q4R and diodes D1R-D6R. S phase arm 3S includes IGBT devices Q1S-Q4S and diodes D1S-D6S. T phase arm 3T includes IGBT devices Q1T-Q4T and diodes D1T-D6T. U phase arm 4U includes IGBT devices Q1U-Q4U and diodes D1U-D6U. V phase arm 4V includes IGBT devices Q1V-Q4V and diodes DIV-D6V. W phase arm 4W includes IGBT devices Q1W-Q4W and diodes D1W-D6W.

Hereinafter, each phase arm of converter 3A and each phase arm of inverter 4A will be described collectively, and accordingly, the reference characters R, S, T, U, V, and W will collectively be indicated as "x". IGBT devices Q1$x$-Q4$x$ are connected between dc positive line 13 and dc negative line 14 in series. Diodes D1$x$-D4$x$ are connected to IGBT devices Q1$x$-Q4$x$, respectively, in antiparallel. Diode D5$x$ is connected to a node of IGBT devices Q1x and Q2$x$ and to a neutral point 20. Diode D6$x$ is connected to a node of IGBT devices Q3$x$ and Q4$x$ and to neutral point 20. Diode D5$x$ has a cathode connected to the node of IGBT devices Q1$x$ and Q2$x$, and an anode connected to neutral point 20. Diode D6$x$ has an anode connected to the node of IGBT devices Q3$x$ and Q4$x$, and a cathode connected to neutral point 20. Diodes D1$x$-D4$x$ function as free-wheeling diodes, and diodes D5$x$ and D6$x$ function as clamping diodes.

Converter 3A has each phase arm (3R, 3S, 3T) such that a node of IGBT devices Q2$x$ and Q3$x$ corresponds to an ac input terminal and a node of diodes D5$x$ and D6$x$ corresponds to a dc output terminal. Inverter 4A has each phase arm (4U, 4V, 4T) such that a node of diodes D5$x$ and D6$x$ corresponds to a dc input terminal and a node of IGBT devices Q2$x$ and Q3$x$ corresponds to an ac output terminal. Converter 3A has each phase arm (3R, 3S, 3T) with the ac input terminal connected to a corresponding line (R phase line RL, S phase line SL, T phase line TL), and inverter 4A has each phase arm (4U, 4V, 4T) with the ac output terminal connected to a corresponding line (U phase line UL, V phase line VL, W phase line WL). Converter 3A has each phase arm with the dc output terminal connected to neutral point 20, and inverter 4A has each phase arm with the dc input terminal connected to neutral point 20.

Inverter 4A is controlled in a configuration identical to those shown in FIGS. 6 and 7. Converter 3A is controlled in a configuration identical to those shown in FIGS. 8 and 9.

Figure 18:
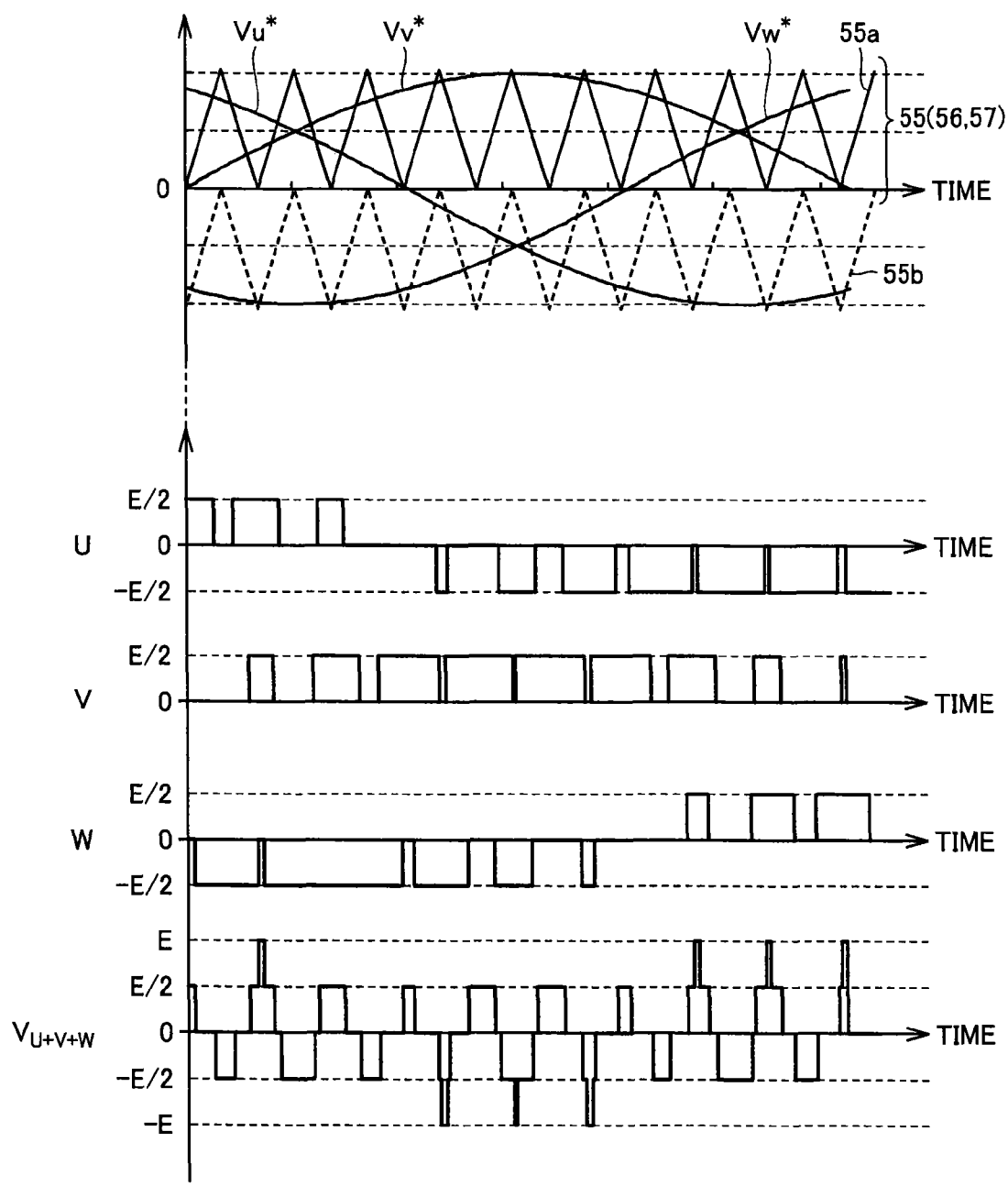
FIG. 18 is a signal waveform diagram for illustrating PWM-controlling inverter 4A shown in FIG. 16.

FIG. 18 is a signal waveform diagram for illustrating PWM-controlling inverter 4A shown in FIG. 16. With reference to FIG. 18, carrier wave signals 55, 56 and 57 have mutually equal phases. FIG. 18 represents carrier wave signals 55-57 as a single carrier wave signal. Carrier wave signal 55 includes carrier wave signals 55$a$ and 55$b$. Carrier wave signal 55$a$ is a positive signal varying on the positive side. Carrier wave signal 55$b$ is a negative signal varying on the negative side. As well as carrier wave signal 55, carrier wave signals 56 and 57 each include a positive signal and a negative signal.

When voltage command value Vu* is larger than the value of carrier wave signal 55$a$, a voltage of E/2 is output on U phase line UL. For voltage command value Vu* having a negative value, when voltage command value Vu* is larger in absolute value than carrier wave signal 55$b$ a voltage of −E/2 is output on U phase line UL. For voltage command value Vu* having a positive value smaller than the value of carrier wave signal 55$a$, U phase line UL is zero in voltage. For voltage command value Vu* having a negative value smaller in absolute value than carrier wave signal 55$b$, U phase line UL is zero in voltage. Voltage output on each of V phase line VL and the W phase line is also determined according to the above described relationship between a voltage command value and a value of a carrier wave signal.

As has been set forth above, a voltage of E/2, 0, or −E/2 is developed on each of U phase line UL, V phase line VL, and W phase line WL. When any one of U phase line UL, V phase line VL, and W phase line WL is zero in voltage and the other two have a voltage of E/2, zero phase component $V_{U+V+W}$ is E/2+E/2+0=E. When any one of U phase line UL, V phase line VL, and W phase line WL is zero in voltage and the other two have a voltage of −E/2, zero phase component $V_{U+V+W}$ is −E/2−E/2+0=−E. Zero phase component $V_{U+V+W}$ thus has a positive peak value of +E and a negative peak value of −E.

As can be seen from comparing FIG. 13 and FIG. 18, an inverter configured with a multilevel circuit applied thereto can contribute to a reduced zero phase component. In the present embodiment, similarly as done in the first embodiment, three carrier wave signals respectively corresponding to three phases have one carrier wave signal with a phase offset by 180 degrees from those of the other two carrier wave signals. This can reduce zero phase component $V_{U+V+W}$, as time averaged, to be smaller than controlled in the first embodiment.

Figure 19:
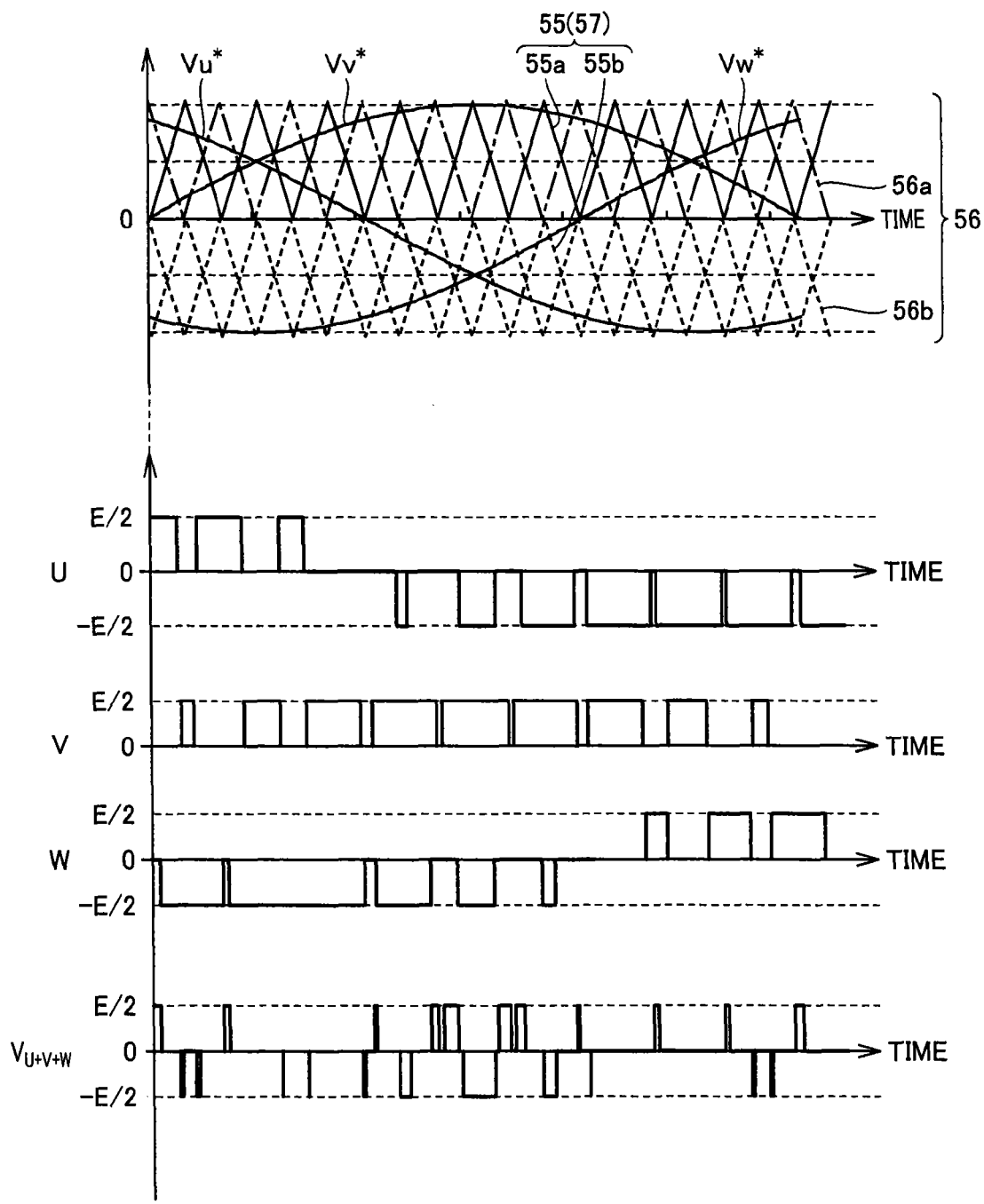
FIG. 19 is a waveform diagram for illustrating how the inverter is controlled according to the fourth embodiment.

FIG. 19 is a waveform diagram for illustrating how the inverter is controlled according to the fourth embodiment. With reference to FIG. 19, carrier wave signal 56 includes carrier wave signals 56$a$ and 56$b$. Carrier wave signal 56$a$ varies on the positive side. Carrier wave signal 56$b$ varies on the negative side. Carrier wave signal 56 has a phase offset by 180 degrees from that of carrier wave signal 55. Carrier wave signal 55 is in phase with carrier wave signal 57. Similarly as has been described in the first embodiment, the fourth embodiment allows three carrier wave signals corresponding to three phases, respectively, to have a carrier wave signal corresponding to one phase with the phase offset by 180 degrees from those of the carrier wave signals corresponding to the other phases.

As controlled as described above, zero phase component $V_{U+V+W}$ has a positive peak value of E/2 and a negative peak value of –E/2. Controlling as represented in FIG. 19 allows zero phase component $V_{U+V+W}$ to have a peak value smaller than controlling as represented in FIG. 18 does.

Figure 20:
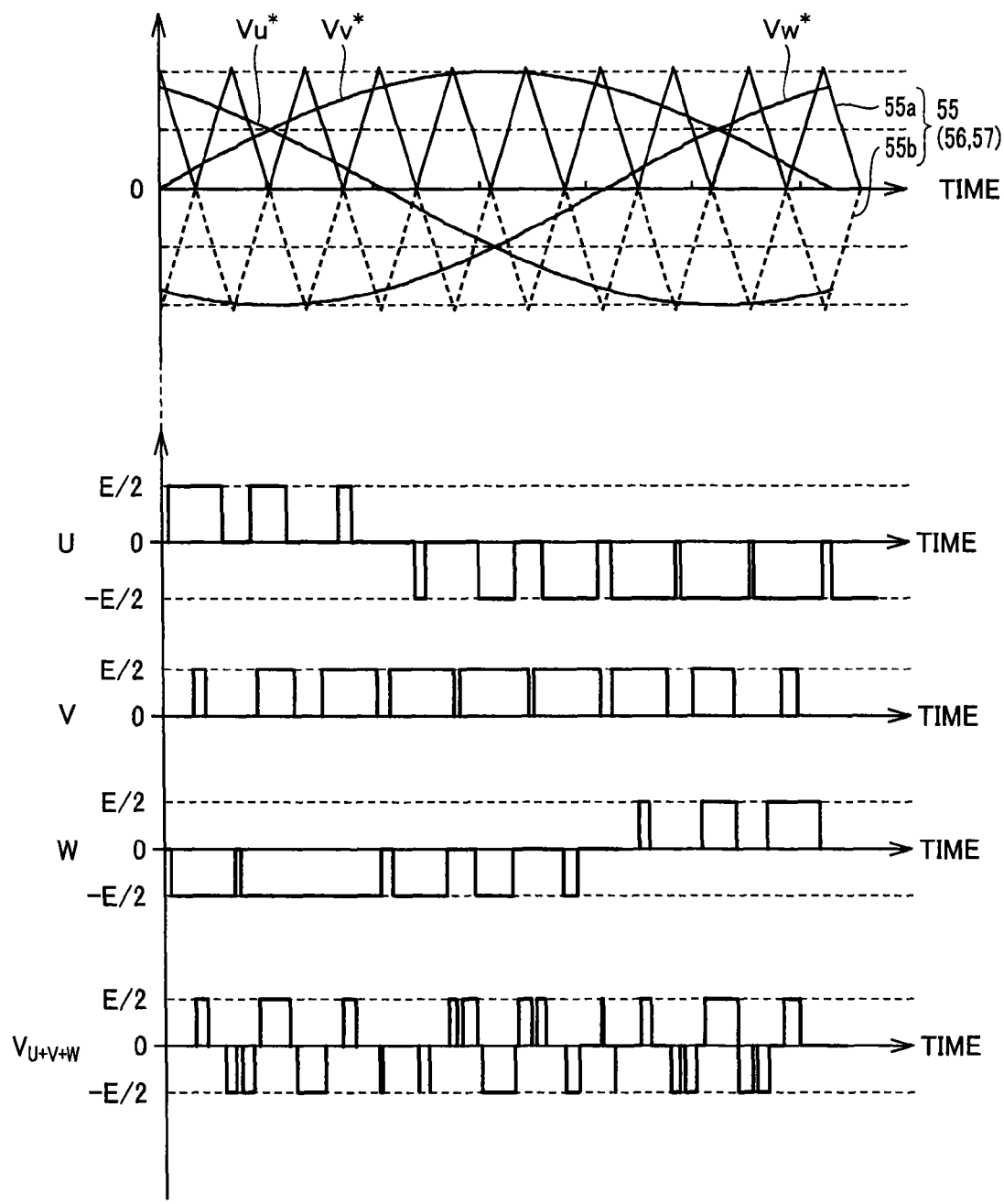
FIG. 20 is a waveform diagram for illustrating how the inverter is controlled according to the fourth embodiment in another manner.

FIG. 20 is a waveform diagram for illustrating how the inverter is controlled according to the fourth embodiment in another manner. With reference to FIG. 20, a negative carrier wave signal has a phase offset by 180 degrees from that of a positive carrier wave signal. Specifically, carrier wave signal 55b has a phase offset by 180 degrees from that of carrier wave signal 55a. Carrier wave signals 56 and 57 each has a positive carrier wave signal in phase with carrier wave signal 55a. Carrier wave signals 56 and 57 each has a negative carrier wave signal in phase with carrier wave signal 55b.

As controlled as described above, zero phase component $V_{U+V+W}$ has a positive peak value of E/2 and a negative peak value of –E/2. Controlling as represented in FIG. 20 thus allows zero phase component $V_{U+V+W}$ to have a reduced peak value.

As has been set forth above, the fourth embodiment provides an inverter with a multilevel circuit applied thereto. A reduced zero phase component can thus be achieved. Furthermore the fourth embodiment allows three carrier wave signals corresponding to three phases, respectively, to have a carrier wave signal corresponding to one phase with the phase offset by 180 degrees from those of the carrier wave signals corresponding to the other phases. Alternatively, positive and negative carrier wave signals corresponding to each of the U phase, the V phase, and the W phase have phases, respectively, offset by 180 degrees. This allows zero phase component $V_{U+V+W}$ to have a further reduced peak value.

Controlling as represented in FIG. 19 or 20 is not limited to being applied to inverter 4A, and it is also applicable to converter 3A. When controlling as represented in FIG. 20 is applied to both inverter 4A and converter 3A, it is more preferable that it be applied, as follows: Converter 3A and inverter 4A are controlled via positive carrier wave signals having phases, respectively, with a difference of 180 degrees. Converter 3A and inverter 4A are controlled via negative carrier wave signals having phases, respectively, with a difference of 180 degrees. This allows zero phase component $V_{U+V+W}$ to be further reduced.

While the above embodiments have each disclosed a power supply apparatus including an inverter and a converter, the present invention is also applicable to a power supply apparatus configured only of an inverter or a power supply apparatus configured only of a converter.

It should be understood that the embodiments disclosed herein have been described for the purpose of illustration only and in a non-restrictive manner in any respect. The scope of the present invention is defined by the terms of the claims, rather than the description above, and is intended to include any modifications within the meaning and scope equivalent to the terms of the claims.

REFERENCE SIGNS LIST

1: commercial ac power supply; 2: input filter; 3, 3A: converter; 3R, 3S, 3T, 4U, 4V, 4W: arm; 4, 4A: inverter; 5: output filter; 6: ac load; 8: storage battery; 9: dc load; 10: control device; 11, 11R, 11S, 11T, 15, 16, 19, 19U, 19V, 19W: capacitor; 12, 12R, 12S, 12T, 18, 18U, 18V, 18W: reactor; 13: dc positive line; 14: dc negative line; 17: neutral point line; 20: neutral point; 21, 23, 25, 26: voltage sensor; 22, 24, 22R, 22S, 22T, 24U, 24V, 24W: current sensor; 27: ground line; 31, 61: voltage command generation circuit; 32: control unit; 33, 35: PWM circuit; 34, 36: gate circuit; 41: voltage control circuit; 42U, 42V, 42W, 82, 86A-86C: subtractor; 43, 87: current control circuit; 44U, 44V, 44W, 51, 88A-88C: adder; 51U, 51V, 51W, 51R, 51S, 51T: carrier wave signal generation circuit; 52U, 52V, 52W, 52R, 52S, 52T: comparator; 81: reference value generation circuit; 83: dc voltage control circuit; 84: sinusoidal wave generation circuit; 85A-85C: multiplier; 100, 101: uninterruptible power supply; D1R-D6R, D1S-D6S, D1T-D6T, D1U-D6U, D1V-D6V, D1W-D6W: diode; Q1R-Q4R, Q1S-Q4S, Q1T-Q4T, Q1U-Q4U, Q1V-Q4V, Q1W-Q4W: IGBT device; RL: R phase line; SL: S phase line; TL: T phase line; UL: U phase line; VL: V phase line; WL: W phase line.

The invention claimed is:

1. A power supply apparatus comprising:
  a power conversion circuit including first to third arms connected to first to third alternating current lines, respectively;
  a filter disposed between said first to third alternating current lines and said power conversion circuit; and
  a PWM control circuit for controlling said power conversion circuit in a pulse width modulation method,
  said PWM control circuit including
    a first voltage command value generation circuit generating first to third voltage command values corresponding to said first to third alternating current lines, respectively, in voltage;
    a first carrier wave signal generation circuit generating first to third carrier wave signals corresponding to said first to third voltage command values, respectively;
    a first comparator comparing said first voltage command value with a value of said first carrier wave signal to generate a first control signal for controlling said first arm;
    a second comparator comparing said second voltage command value with a value of said second carrier wave signal to generate a second control signal for controlling said second arm; and
    a third comparator comparing said third voltage command value with a value of said third carrier wave signal to generate a third control signal for controlling said third arm,
  said first to third carrier wave signals including first and second signals having phases offset by 180 degrees from each other,
  said power conversion circuit being an inverter, the power supply apparatus further comprising a converter connected to said inverter via a direct current positive line and a direct current negative line, wherein
  said converter includes fourth to sixth arms connected to fourth to sixth alternating current lines, respectively,
  said PWM control circuit includes
    a second voltage command value generation circuit generating fourth to sixth voltage command values corresponding to said fourth to sixth alternating current lines, respectively, in voltage;
    a second carrier wave signal generation circuit generating fourth to sixth carrier wave signals corresponding to said fourth to sixth voltage command values, respectively;
    a fourth comparator comparing said fourth voltage command value with a value of said fourth carrier wave signal to generate a fourth control signal for controlling said fourth arm;

a fifth comparator comparing said fifth voltage command value with a value of said fifth carrier wave signal to generate a fifth control signal for controlling said fifth arm; and a sixth comparator comparing said sixth voltage command value with a value of said sixth carrier wave signal to generate a sixth control signal for controlling said sixth arm, said first signal is said first carrier wave signal, said second signal is said second carrier wave signal, said third carrier wave signal is in phase with said first carrier wave signal, said fourth carrier wave signal and said fifth carrier wave signal have a phase difference of 180 degrees, said sixth carrier wave signal is in phase with said fourth carrier wave signal, and said second carrier wave signal and said fifth carrier wave signal have a phase difference of 180 degrees.

2. The power supply apparatus according to claim 1, wherein:

said first signal is said first carrier wave signal;

said second signal is said second carrier wave signal; and said third carrier wave signal is in phase with said first carrier wave signal.

3. The power supply apparatus according to claim 1, wherein said first and second signals are any two of said first to third carrier wave signals.

4. The power supply apparatus according to claim 1, wherein:

said first to third arms are each a multilevel circuit;

said first to third carrier wave signals each include a positive signal varying on a positive side and a negative signal varying on a negative side;

said first signal is said positive signal;

said second signal is said negative signal; and said positive signal and said negative signal have a phase difference of 180 degrees.

5. The power supply apparatus according to claim 1, wherein said power conversion circuit is an inverter.

6. The power supply apparatus according to claim 1, wherein said power conversion circuit is a converter.

* * * * *